(12) United States Patent
Xia et al.

(10) Patent No.: US 7,662,880 B2
(45) Date of Patent: Feb. 16, 2010

(54) POLYESTER POLYMER AND COPOLYMER COMPOSITIONS CONTAINING METALLIC NICKEL PARTICLES

(75) Inventors: Zhiyong Xia, Kingsport, TN (US); Donna Rice Quillen, Kingsport, TN (US)

(73) Assignee: Eastman Chemical Company, Kingsport, TN (US)

(*) Notice: Subject to any disclaimer, the term of this patent is extended or adjusted under 35 U.S.C. 154(b) by 716 days.

(21) Appl. No.: 10/996,924

(22) Filed: Nov. 24, 2004

(65) Prior Publication Data

US 2006/0052504 A1    Mar. 9, 2006

Related U.S. Application Data

(63) Continuation-in-part of application No. 10/934,546, filed on Sep. 3, 2004, now abandoned.

(51) Int. Cl.
    *B65D 81/24* (2006.01)
(52) U.S. Cl. .................. 524/440; 524/439; 428/35.8; 428/36.4; 428/328; 428/542.8; 428/913; 206/524.6; 215/400; 252/514
(58) Field of Classification Search ............ 252/514; 215/400; 206/524.6; 428/35.8, 36.4, 328, 428/542.8, 913; 524/439, 440
    See application file for complete search history.

(56) References Cited

U.S. PATENT DOCUMENTS

| | | |
|---|---|---|
| 3,264,255 A | 8/1966 | Taylor |
| 3,420,913 A | 1/1969 | Railsback |
| 3,660,328 A | 5/1972 | Lindquist, Jr. |
| 3,733,309 A | 5/1973 | Wyeth et al. |
| 3,795,601 A | 3/1974 | Brewer et al. |
| 3,867,315 A * | 2/1975 | Tigner et al. ............ 252/512 |
| 3,917,604 A | 11/1975 | Hoyle |
| 3,951,905 A | 4/1976 | Sano et al. |
| 4,087,482 A | 5/1978 | Shaffer |
| 4,097,445 A | 6/1978 | Martins et al. |
| 4,159,301 A | 6/1979 | Buser et al. |
| 4,185,043 A | 1/1980 | Shaffer |
| 4,228,549 A | 10/1980 | Rispoli |
| 4,230,595 A | 10/1980 | Yamaji et al. |
| 4,250,078 A | 2/1981 | McFarlane et al. |
| 4,321,298 A | 3/1982 | Shaffer et al. |
| 4,340,721 A | 7/1982 | Bonnebat et al. |
| 4,343,922 A | 8/1982 | Shaffer |
| 4,359,570 A | 11/1982 | Davis et al. |
| 4,360,564 A | 11/1982 | Philipp |
| 4,408,004 A | 10/1983 | Pengilly |
| 4,420,581 A | 12/1983 | McFarlane et al. |
| 4,476,272 A | 10/1984 | Pengilly |
| 4,481,314 A | 11/1984 | Rule |
| 4,520,078 A | 5/1985 | Rabinowitz et al. |
| 4,535,118 A | 8/1985 | Pengilly |
| 4,545,926 A * | 10/1985 | Fouts et al. ............ 252/511 |
| 4,604,303 A | 8/1986 | Takakura et al. |
| 4,617,373 A | 10/1986 | Pruett et al. |
| 4,617,374 A | 10/1986 | Pruett et al. |
| 4,654,399 A | 3/1987 | Callander et al. |
| 4,702,963 A | 10/1987 | Phillips et al. |
| 4,702,980 A | 10/1987 | Matsuura et al. |
| 4,740,377 A | 4/1988 | Dawes et al. |
| 4,745,173 A | 5/1988 | Weaver et al. |
| 4,775,598 A | 10/1988 | Jaeckel |
| 4,851,497 A | 7/1989 | Wakui et al. |
| 4,871,790 A | 10/1989 | Lamanna et al. |
| 5,106,942 A | 4/1992 | Krutak et al. |
| 5,147,722 A | 9/1992 | Koslow |
| 5,189,077 A | 2/1993 | Kerby |
| 5,220,140 A | 6/1993 | Ball et al. |
| 5,254,625 A | 10/1993 | Weaver et al. |
| 5,300,746 A | 4/1994 | Walters et al. |
| 5,310,977 A | 5/1994 | Stenkamp et al. |
| 5,318,797 A | 6/1994 | Matijevic et al. |
| 5,340,884 A | 8/1994 | Mills et al. |
| 5,367,070 A | 11/1994 | Nath et al. |
| 5,372,864 A | 12/1994 | Weaver et al. |

(Continued)

FOREIGN PATENT DOCUMENTS

CN    1312218    9/2001

(Continued)

OTHER PUBLICATIONS

Research Disclosure, 39771, May 1997, 343.

(Continued)

*Primary Examiner*—Lorna M Douyon
*Assistant Examiner*—Amina Khan
(74) *Attorney, Agent, or Firm*—Michael K. Carrier; Bernard J. Graves, Jr.

(57) ABSTRACT

Polyester compositions are disclosed that include polyester polymers or copolymers having incorporated therein metallic nickel particles that improve the reheat properties of the compositions. Processes for making such compositions are also disclosed. The nickel particles may be incorporated in the polyester by melt compounding, or may be added at any stage of the polymerization, such as during the melt-phase of the polymerization. A range of particle sizes may be used, as well as a range of particle size distributions. The polyester compositions are suitable for use in packaging made from processes in which a reheat step is desirable.

13 Claims, 10 Drawing Sheets

U.S. PATENT DOCUMENTS

| | | | |
|---|---|---|---|
| 5,382,157 A | 1/1995 | Denis et al. | |
| 5,384,377 A | 1/1995 | Weaver et al. | |
| 5,409,983 A | 4/1995 | Jones et al. | |
| 5,419,936 A | 5/1995 | Tindale | |
| 5,514,462 A | 5/1996 | Endo et al. | |
| 5,529,744 A | 6/1996 | Tindale | |
| 5,532,332 A | 7/1996 | Weaver et al. | |
| 5,539,078 A | 7/1996 | Burkett et al. | |
| 5,593,740 A | 1/1997 | Strumban et al. | |
| 5,650,481 A | 7/1997 | Yau et al. | |
| 5,656,221 A | 8/1997 | Schumann et al. | |
| 5,656,716 A | 8/1997 | Schmidt et al. | |
| 5,742,223 A * | 4/1998 | Simendinger et al. | 338/21 |
| 5,774,571 A | 6/1998 | Marshall | |
| 5,830,544 A | 11/1998 | Kerscher et al. | |
| 5,851,668 A | 12/1998 | Sandor et al. | |
| 5,906,882 A | 5/1999 | Valente et al. | |
| 5,925,710 A | 7/1999 | Wu et al. | |
| 5,940,022 A | 8/1999 | Takatsu | |
| 5,976,450 A | 11/1999 | Mreijen | |
| 5,984,997 A | 11/1999 | Bickmore et al. | |
| 5,998,004 A | 12/1999 | Nishino et al. | |
| 6,020,419 A | 2/2000 | Bock et al. | |
| 6,022,920 A | 2/2000 | Maxwell et al. | |
| 6,031,128 A | 2/2000 | Roh et al. | |
| 6,048,957 A | 4/2000 | Ekart et al. | |
| 6,165,601 A | 12/2000 | Noda et al. | |
| 6,197,223 B1 | 3/2001 | Weaver et al. | |
| 6,197,851 B1 | 3/2001 | Maxwell et al. | |
| 6,200,659 B1 | 3/2001 | Fujimori et al. | |
| 6,258,313 B1 | 7/2001 | Gottlieb | |
| 6,261,656 B1 | 7/2001 | Semersky | |
| 6,274,852 B1 | 8/2001 | Blok et al. | |
| 6,300,399 B1 | 10/2001 | Gallucci et al. | |
| 6,323,271 B1 | 11/2001 | Caldwell et al. | |
| 6,358,578 B1 | 3/2002 | Otto et al. | |
| 6,365,659 B1 | 4/2002 | Aoyama et al. | |
| 6,427,826 B1 | 8/2002 | Li et al. | |
| 6,428,882 B1 | 8/2002 | Peiffer et al. | |
| 6,440,383 B1 | 8/2002 | Duyvesteyn et al. | |
| 6,451,220 B1 | 9/2002 | Ziolo et al. | |
| 6,465,098 B2 | 10/2002 | Mizuguchi et al. | |
| 6,472,471 B2 | 10/2002 | Cooke et al. | |
| 6,473,024 B2 | 10/2002 | Toyoda et al. | |
| 6,500,890 B2 | 12/2002 | Edwards et al. | |
| 6,503,586 B1 | 1/2003 | Wu et al. | |
| 6,548,570 B1 | 4/2003 | Lange | |
| 6,572,810 B2 | 6/2003 | Chatterjee et al. | |
| 6,590,044 B2 | 7/2003 | Suzuki et al. | |
| 6,590,069 B2 | 7/2003 | Nichols et al. | |
| 6,602,568 B2 | 8/2003 | Semersky | |
| 6,660,792 B2 | 12/2003 | Massey et al. | |
| 6,710,158 B2 | 3/2004 | Edwards et al. | |
| 6,716,904 B2 | 4/2004 | Takahashi | |
| 6,727,306 B2 | 4/2004 | Edwards et al. | |
| 6,727,372 B2 | 4/2004 | Cyr et al. | |
| 6,773,800 B2 | 8/2004 | Hosoe et al. | |
| 6,777,048 B2 | 8/2004 | Quillen | |
| 6,780,916 B2 | 8/2004 | Tung et al. | |
| 6,797,401 B2 | 9/2004 | Herron | |
| 6,827,897 B2 | 12/2004 | Hall et al. | |
| 6,896,830 B2 | 5/2005 | Carlton et al. | |
| 6,916,354 B2 | 7/2005 | Elliott | |
| 6,933,055 B2 * | 8/2005 | Share et al. | 428/474.4 |
| 7,041,716 B2 | 5/2006 | TonThat et al. | |
| 7,063,377 B2 * | 6/2006 | Brei et al. | 296/187.09 |
| 7,097,686 B2 * | 8/2006 | Chandler et al. | 75/331 |
| 7,129,317 B2 | 10/2006 | Moore et al. | |
| 7,300,967 B2 | 11/2007 | Xia | |
| 7,303,795 B2 | 12/2007 | Neal et al. | |
| 7,439,294 B2 | 10/2008 | Xia | |
| 2002/0011694 A1 | 1/2002 | Nichols et al. | |
| 2002/0033560 A1 | 3/2002 | Nichols et al. | |
| 2002/0137872 A1 | 9/2002 | Schneider et al. | |
| 2003/0017336 A1 | 1/2003 | Gedanken et al. | |
| 2003/0018115 A1 | 1/2003 | Massey et al. | |
| 2003/0040564 A1 | 2/2003 | Tung et al. | |
| 2003/0057201 A1 | 3/2003 | Johnson | |
| 2003/0108702 A1 | 6/2003 | Tung et al. | |
| 2004/0030029 A1 | 2/2004 | Weinhold et al. | |
| 2004/0086733 A1 | 5/2004 | Fujimori et al. | |
| 2004/0101642 A1 | 5/2004 | Quillen et al. | |
| 2004/0122150 A1 | 6/2004 | Quillen et al. | |
| 2004/0178386 A1 * | 9/2004 | Tung et al. | 252/188.28 |
| 2004/0180159 A1 | 9/2004 | Neal et al. | |
| 2004/0185198 A1 | 9/2004 | Sisson et al. | |
| 2004/0236066 A1 | 11/2004 | Moore et al. | |
| 2004/0249113 A1 | 12/2004 | Quillen et al. | |
| 2005/0058846 A1 | 3/2005 | Matsui et al. | |
| 2005/0165148 A1 | 7/2005 | Bogerd et al. | |
| 2005/0170115 A1 | 8/2005 | Tibbitt et al. | |
| 2005/0180284 A1 | 8/2005 | Hay et al. | |
| 2005/0203267 A1 | 9/2005 | Jernigan et al. | |
| 2005/0274454 A1 * | 12/2005 | Extrand | 156/272.4 |
| 2006/0033078 A1 * | 2/2006 | Rollick | 252/181.1 |
| 2006/0052504 A1 | 3/2006 | Xia et al. | |
| 2006/0110557 A1 | 5/2006 | Xia et al. | |
| 2006/0205855 A1 | 9/2006 | Xia | |
| 2007/0203279 A1 | 8/2007 | Jarvis et al. | |
| 2007/0260002 A1 | 11/2007 | Xia et al. | |
| 2008/0058495 A1 | 3/2008 | Quillen et al. | |

FOREIGN PATENT DOCUMENTS

| | | |
|---|---|---|
| DE | 32 48 840 A1 | 9/1983 |
| EP | 0 378 154 | 7/1990 |
| EP | 0 429 311 A2 | 5/1991 |
| EP | 0581246 | 2/1994 |
| EP | 0465040 B1 | 1/1997 |
| EP | 0884365 A2 | 12/1998 |
| EP | 0921144 A1 | 6/1999 |
| EP | 1152035 A1 | 11/2001 |
| EP | 1431337 A2 | 6/2004 |
| EP | 1 535 944 A1 | 6/2005 |
| FR | 2 675 654 | 4/1991 |
| GB | 1 242 636 | 8/1971 |
| GB | 1 285 904 | 8/1972 |
| GB | 2 112 827 A | 7/1983 |
| JP | 52-039790 A | 3/1977 |
| JP | 56159248 | 12/1981 |
| JP | 59-015427 A | 1/1984 |
| JP | 60-151826 | 8/1985 |
| JP | 60264313 | 12/1985 |
| JP | 61-278558 | 12/1986 |
| JP | 61-291650 | 12/1986 |
| JP | 62-039208 | 2/1987 |
| JP | 62-177035 | 8/1987 |
| JP | 63 237207 | 10/1988 |
| JP | 63 237207 A | 10/1988 |
| JP | 63-315604 | 12/1988 |
| JP | 02194030 | 7/1990 |
| JP | 22-14734 | 8/1990 |
| JP | 06-184333 A | 7/1994 |
| JP | 06 215618 | 8/1994 |
| JP | 06 215618 A | 8/1994 |
| JP | 6-279599 A | 10/1994 |
| JP | 62-79599 | 10/1994 |
| JP | 07058490 | 3/1995 |
| JP | 07292087 | 11/1995 |
| JP | 09-256220 A | 9/1997 |
| JP | 1999 071106 A | 3/1999 |
| JP | 11-181067 A | 7/1999 |
| JP | 1999 236440 A | 8/1999 |
| JP | 11-349868 | 12/1999 |

| | | |
|---|---|---|
| JP | 2000 302854 A | 10/2000 |
| JP | 2001 039707 A | 2/2001 |
| JP | 2001048972 | 2/2001 |
| JP | 2001226474 | 8/2001 |
| JP | 2001 262016 | 9/2001 |
| JP | 2003306601 | 10/2003 |
| WO | WO 95/02504 A1 | 1/1995 |
| WO | WO 96/03163 | 2/1996 |
| WO | WO 96/03163 A1 | 2/1996 |
| WO | WO 99/57173 A1 | 11/1999 |
| WO | WO 01/21680 A1 | 3/2001 |
| WO | WO 01/46306 A1 | 6/2001 |
| WO | WO 01/47688 A2 | 7/2001 |
| WO | WO 02/31840 A1 | 4/2002 |
| WO | WO 03/010225 A1 | 2/2003 |
| WO | WO 03/010226 A1 | 2/2003 |
| WO | WO 2004/013015 A1 | 2/2004 |
| WO | WO 2004/031258 | 4/2004 |
| WO | WO 2004/067616 A1 | 8/2004 |
| WO | WO 2004/083294 A1 | 9/2004 |
| WO | WO 2005/068531 A1 | 7/2005 |
| WO | WO 2005/075550 A1 | 8/2005 |
| WO | WO 2005/095516 A1 | 10/2005 |
| WO | WO 2005/011058 A2 | 11/2005 |
| WO | WO 2006/028757 A2 | 3/2006 |
| WO | WO 2006/028770 A1 | 3/2006 |

OTHER PUBLICATIONS

A. Boehm and A. Glaser, "The quaterrylimides-highly efficient NIR absorbers for plastics," ANTEC paper 2004, Chicago, IL, May 2004.
Wu, S. "A Generalized Criterion for Rubber Toughening: The Critical Matrix Ligament Thickness," Journal of Applied Polymer Science, vol. 35, 549-561, 1988, John Wiley & Sons, Inc.
Co-pending U.S. Appl. No. 10/988,226, filed Nov. 12, 2004.
Co-pending U.S. Appl. No. 10/988,133, filed Nov. 12, 2004.
Co-pending U.S. Appl. No. 10/988,263, filed Nov. 12, 2004.
Co-pending U.S. Appl. No. 10/996,944, filed Nov. 24, 2004.
Co-pending U.S. Appl. No. 10/997,040, filed Nov. 24, 2004.
Co-pending U.S. Appl. No. 11/005,689, filed Dec. 7, 2004.
Co-pending U.S. Appl. No. 11/054,194, filed Feb. 9, 2005.
Notification of Transmittal of the International Search Report and the Written Opinion of the International Searching Authority, or the Declaration date of mailing Feb. 1, 2006 for International Appl. No. PCT/US2005/030657.
Notification of Transmittal of the International Search Report and the Written Opinion of the International Searching Authority, or the Declaration date of mailing Feb. 16, 2006 for International Appl. No. PCT/US2005/030551.
Notification of Transmittal of the International Search Report and the Written Opinion of the International Searching Authority, or the Declaration date of mailing Mar. 14, 2006 for International Appl. No. PCT/US2005/042471.
Notification of Transmittal of the International Search Report and the Written Opinion of the International Searching Authority, or the Declaration date of mailing Feb. 28, 2006 for International Appl. No. PCT/US2005/038730.
Notification of Transmittal of the International Search Report and the Written Opinion of the International Searching Authority, or the Declaration date of mailing Apr. 7, 2006.
Notification of Transmittal of the International Search Report and the Written Opinion of the International Searching Authority, or the Declaration date of mailing May 17, 2006 on the PCT filing of the co-pending U.S. Appl. No. 11/054,194, filed Feb. 9, 2005.
Notification of Transmittal of the International Search Report and the Written Opinion of the International Searching Authority, or the Declaration date of mailing Apr. 7, 2006 on the PCT filing of the co-pending U.S. Appl. No. 10/988,263, filed Nov. 12, 2004.
Co-pending U.S. Appl. No. 11/095,834, filed Mar. 31, 2005.
Co-pending U.S. Appl. No. 11/228,672, filed Sep. 16, 2005.
Co-pending U.S. Appl. No. 11/228,733, filed Sep. 16, 2005.
Co-pending U.S. Appl. No. 11/228,773, filed Sep. 16, 2005.

Encyclopedia of Chemical Technology; $4^{th}$ Edition; vol. 4; pp. 1015-1037; John Wiley and Sons, New York.
Pigment Handbook; 1973; pp. 323-349-; vol. 1; John Wiley and Sons; New York.
Billmeyer Jr., Fred W.; Principles of Color Technology; pp. 25-66; John Wiley and Sons; New York; 1981.
Pierson, H. O.; Handbook of Carbon, Graphite, Diamond and Fullerenes: Properties and Applications; pp. 122-140; Noyes Publications; 1993.
Toth, Louis E.; Transition Metal Carbides and Nitrides; p. 87; 1971; Academic Press; London.
Weissmann, Mariana, et al.; "Theoretical study of carbon-coated iron nanowires"; Physical Review B 70, 201401-1 through 201401-4; 2004; The American Physical Society.
Zhang, Z. D. et al.; "Shell/core structure and magnetic properties of carbon-coated Fe-Co© nanocapsules"; Journal of Physics: Condensed Matter 13; 1921-1929; 2001; Institute of Physics Publishing Ltd.
Office Communication dated Nov. 8, 2006 from the co-pending U.S. Appl. No. 11/005,689, filed Dec. 7, 2004.
Notification of Transmittal of the International Search Report and the Written Opinion of the International Searching Authority, or the Declaration date of mailing Nov. 17, 2006 on the PCT filing of the co-pending U.S. Appl. No. 11/228,773, filed Sep. 16, 2005.
Copending U.S. Appl. No. 11/372,819, filed Mar. 10, 2006.
Copending U.S. Appl. No. 11/229,238, filed Sep. 16, 2005.
Copending U.S. Appl. No. 11/495,431, filed Jul. 28, 2006.
Notification of Transmittal of the International Search Report and the Written Opinion of the International Searching Authority, or the Declaration date of mailing Feb. 15, 2007 for International Application No. PCT/US2005/030834.
Notification of Transmittal of the International Search Report and the Written Opinion of the International Searching Authority, or the Declaration date of mailing Jun. 26, 2006 for International Application No. PCT/US2006/009692.
Notification of Transmittal of the International Search Report and the Written Opinion of the International Searching Authority, or the Declaration date of mailing Feb. 13, 2007 for International Application No. PCT/US2006/034412.
Written Opinion of the International Searching Authority date of mailing Aug. 14, 2007 for International Appl. No. PCT/US2005/038999, counterpart of copending U.S. Appl. No. 11/228,672.
Notification of Transmittal of the International Search Report and the Written Opinion of the International Searching Authority, or the Declaration date of mailing Sep. 27, 2007 for International Application No. PCT/US2006/034616.
Encyclopedia of Chemical Technology; $4^{th}$ Edition; vol. 24; pp. 225-349; John Wiley and Sons, New York.
Chen, et al.; "Preparation of nanosized titania powder via the controlled hydrolysis of titanium alkoxide"; Journal of Materials Science 31; pp. 3497-3500; 1996.
Li et al.; "Synthesis of Nanocrystalline Titanium Nitride Powders by Direct Nitridation of Titanium Oxide"; Journal American Ceramic Society, vol. 84; No. 12; pp. 2045-3047; 2001.
Peelamedu, et al.; "TiN from Ti02 via Cycling Microwave"; American Ceramic Society Bulletin; vol. 81; No. 8; pp. 57-60; Aug. 2002.
Encyclopedia of Pol. Sci., vol. 11, p. 96-99, Wiley and Sons, 2002.
Office Action dated Dec. 7, 2005, in co-pending U.S. Appl. No. 11/005,689.
Office Action dated Jun. 8, 2006, in co-pending U.S. Appl. No. 11/005,689.
Office Action dated May 29, 2007, in co-pending U.S. Appl. No. 11/005,689.
Office Action dated Oct. 18, 2007, in co-pending U.S. Appl. No. 11/005,689.
Office Action dated Dec. 27, 2007, in co-pending U.S. Appl. No. 11/005,689.
Office Action dated Oct. 4, 2007, in co-pending U.S. Appl. No. 10/996,944.
Office Action dated Sep. 7, 2007, in co-pending U.S. Appl. No. 10/997,040.
Office Action dated Jun. 21, 2007, in co-pending U.S. Appl. No. 11/372,819.

Office Action dated Nov. 14, 2007, in co-pending U.S. Appl. No. 11/372,819.
Office Action dated Nov. 29, 2005, in co-pending U.S. Appl. No. 10/988,226.
Office Action dated May 11, 2006, in co-pending U.S. Appl. No. 10/988,226.
Office Action dated Nov. 8, 2006, in co-pending U.S. Appl. No. 10/988,226.
Office Action dated Jun. 5, 2007, in co-pending U.S. Appl. No. 10/988,226.
Notice of Allowance dated Aug. 1, 2007, in co-pending U.S. Appl. No. 10/988,226.
Office Action dated Sep. 6, 2007, in co-pending U.S. Appl. No. 10/988,263.
Office Action dated Jul. 20, 2006, in co-pending U.S. Appl. No. 11/228,672.
Office Action dated Jan. 22, 2007, in co-pending U.S. Appl. No. 11/228,672.
Notice of Allowance dated Jun. 12, 2007, in co-pending U.S. Appl. No. 11/228,672.
Notice of Allowance dated Nov. 29, 2007, in co-pending U.S. Appl. No. 10/796,238.
Office Action dated Feb. 6, 2008, in co-pending U.S. Appl. No. 11/054,194.
Office Action dated Feb. 6, 2008, in co-pending U.S. Appl. No. 11/502,814.
Office Action dated Feb. 20, 2008, in co-pending U.S. Appl. No. 10/996,944.
Office Action dated Apr. 2, 2008, in co-pending U.S. Appl. No. 10/997,040.
Office Action dated Mar. 17, 2008, in co-pending U.S. Appl. No. 10/996,924.
Office Action dated Apr. 29, 2008, in co-pending U.S. Appl. No. 11/228,773.
Office Action dated May 13, 2008, in co-pending U.S. Appl. No. 10/988,263.
Encyclopedia of Chemical Technology; 4$^{th}$ Edition; vol. 23; pp. 658-659; John Wiley and Sons, New York (1997).
Encyclopedia of Chemical Technology; 4$^{th}$ Edition; vol. 3; pp. 368-369; John Wiley and Sons, New York (1997).
Office Action dated May 28, 2008 in co-pending U.S. Appl. No. 11/095,834.
Office Action dated May 30, 2008 in co-pending U.S. Appl. No. 11/372,819.
Office Action dated Dec. 30, 2008 received in co-pending U.S. Appl. No. 11/228,773.
Office Action dated Jan. 22, 2009 received in co-pending U.S. Appl. No. 10/988,263.
Office Action dated May 21, 2008 in co-pending U.S. Appl. No. 11/005,689.
Billmeyer Jr., Fred W.; Principles of Color Technology; p. 188; John Wiley and Sons; New York; 1981.
Office Action dated Jul. 30, 2008 in co-pending U.S. Appl. No. 10/996,944.
Office Action dated Jul. 14, 2008 received in Russian Application 2005141452.
Office Action dated May 13, 2008 received in co-pending U.S. Appl. No. 10/988,263.
www.americanelements.com, 2001.
Office Action dated May 28, 2008 received in co-pending U.S. Appl. No. 11/095,834.
Office Action dated Jul. 28, 2008 received in co-pending U.S. Appl. No. 11/373,251.
Office Action dated Aug. 20, 2008 received in co-pending U.S. Appl. No. 10/997,040.
Weaver et al.; Synthesis of Novel Polymeric Colorants; Coloration Technology; 2002; pp. 48-56; Eastman Chemical Company, Kingsport, TN USA.
Toth; Transition Metal Carbides and Nitrides, General Properties, Preparation and Characterization; 1971; pp. 1-28; Academic Press, Inc., New York.
Kirk-Othmer, Encyclopedia of Chemical Technology, pp. 353-392; vol. 16; 4$^{th}$ Ed., John Wiley and Sons, New York, 2001.
Kirk-Othmer, Encyclopedia of Chemical Technology; pp. 256-278; vol. 22; 4$^{th}$ Ed., John Wiley and Sons, New York, 2001.
Office Action dated Jul. 24, 2007 received in co-pending U.S. Appl. No. 10/996,944.
Office Action dated Feb. 20, 2009 received in co-pending U.S. Appl. No. 11/524,056.
Office Action dated Feb. 26, 2009 received in co-pending U.S. Appl. No. 10/996,944.
Shaviv, Roey; "Synthesis of TiN$_x$C$_y$: optimization of reaction parameters"; Materials Science and Engineering A209; 1996; pp. 345-352.
Office Action dated Apr. 10, 2009 received in co-pending U.S. Appl. No. 10/997,040.
Office Action date of notification Apr. 10, 2009 received on co-pending U.S. Appl. No. 10/997,040.
Office Action date of notification Jul. 17, 2009 received in co-pending U.S. Appl. No. 10/996,944.
Office Action notification date Sep. 24, 2009 received in co-pending U.S. Appl. No. 12/200,976.

* cited by examiner

US 7,662,880 B2

POLYESTER POLYMER AND COPOLYMER COMPOSITIONS CONTAINING METALLIC NICKEL PARTICLES

CROSS-REFERENCE TO RELATED APPLICATION

This application is a continuation-in-part of U.S. patent application Ser. No. 10/934,546, filed on Sep. 3, 2004, now abandoned the disclosure of which is incorporated herein by reference in its entirety.

FIELD OF THE INVENTION

The invention relates to polyester compositions that are useful in packaging, such as in the manufacture of beverage containers by reheat blow molding, or other hot forming processes in which polyester is reheated. The compositions exhibit improved reheat, while maintaining acceptable visual appearance, such as clarity and color.

BACKGROUND OF THE INVENTION

Many plastic packages, such as those made from poly(ethylene terephthalate) (PET) and used in beverage containers, are formed by reheat blow-molding, or other operations that require heat softening of the polymer.

In reheat blow-molding, bottle preforms, which are test-tube shaped extrusion moldings, are heated above the glass transition temperature of the polymer, and then positioned in a bottle mold to receive pressurized air through their open end. This technology is well known in the art, as shown, for example in U.S. Pat. No. 3,733,309, incorporated herein by reference. In a typical blow-molding operation, radiation energy from quartz infrared heaters is generally used to reheat the preforms.

In the preparation of packaging containers using operations that require heat softening of the polymer, the reheat time, or the time required for the preform to reach the proper temperature for stretch blow molding (also called the heat-up time), affects both the productivity and the energy required. As processing equipment has improved, it has become possible to produce more units per unit time. Thus it is desirable to provide polyester compositions which provide improved reheat properties, by reheating faster (increased reheat rate), or with less reheat energy (increased reheat efficiency), or both, compared to conventional polyester compositions.

The aforementioned reheat properties vary with the absorption characteristics of the polymer itself. Heat lamps used for reheating polymer preforms are typically infrared heaters, such as quartz infrared lamps, having a broad light emission spectrum, with wavelengths ranging from about 500 nm to greater than 1,500 nm. However, polyesters, especially PET, absorb poorly in the region from 500 nm to 1,500 nm. Thus in order to maximize energy absorption from the lamps and increase the preform's reheat rate, materials that will increase infrared energy absorption are sometimes added to PET. Unfortunately, these materials tend to have a negative effect on the visual appearance of PET containers, for example increasing the haze level and/or causing the article to have a dark appearance. Further, since compounds with absorbance in the range of 400-700 nm appear colored to the human eye, materials that absorb in this wavelength range will impart color to the polymer.

A variety of black and gray body absorbing compounds have been used as reheat agents to improve the reheat characteristics of polyester preforms under reheat lamps. These reheat additives include carbon black, graphite, antimony metal, black iron oxide, red iron oxide, inert iron compounds, spinel pigments, and infrared absorbing dyes. The amount of absorbing compound that can be added to a polymer is limited by its impact on the visual properties of the polymer, such as brightness, which may be expressed as an L* value, and color, which is measured and expressed as an a* value and a b* value, as further described below.

To retain an acceptable level of brightness and color in the preform and resulting blown articles, the quantity of reheat additive may be decreased, which in turn decreases reheat rates. Thus, the type and amount of reheat additive added to a polyester resin is adjusted to strike the desired balance between increasing the reheat rate and retaining acceptable brightness and color levels. It would be ideal to simultaneously increase the reheat rate and decrease the rate at which color and brightness degrade as the concentration of the reheat additive in a thermoplastic composition is increased.

Another disadvantage of some conventional reheat additives known in the art is their instability during the PET manufacturing process. For example, antimony metal is known to re-oxidize to antimony oxide (which is ineffective at increasing reheat rate) if there are oxygen leaks in the melt-phase or solid-stating manufacturing processes. This results in variability in the heat-up rates of preforms in the reheat blow molding process and thus requires constant adjustments of the infrared lamp settings.

There remains a need in the art for polyester compositions containing reheat additives that improve reheat without the problems associated with known reheat additives, such as re-oxidation, inconsistent reheat, and unacceptable reductions in brightness, clarity, and color.

SUMMARY OF THE INVENTION

The invention relates to polyester compositions that comprise polyester polymers or copolymers, and especially thermoplastic polyester polymers or copolymers, having incorporated therein metallic nickel particles that improve the reheat properties of the compositions. The nickel particles may be incorporated in the polyester by melt compounding, or may be added at any stage of the polymerization, such as during the melt-phase of the polymerization. A range of particle sizes may be used, as well as a range of particle size distributions.

The polyester compositions according to the invention are suitable for use in packaging in which a reheat step is desirable or necessary, and are provided with metallic nickel particles to improve reheat efficiency. These compositions may be provided as a melt, in solid form, as preforms such as for blow molding, as sheets suitable for thermoforming, as concentrates, and as bottles, the compositions comprising a polyester polymer, with metallic nickel particles dispersed in the polyester. Suitable polyesters include polyalkylene terephthalates and polyalkylene naphthalates.

The invention relates also to processes for the manufacture of polyester compositions in which metallic nickel particles may be added to any stage of a polyester polymerization process, such as during the melt phase for the manufacture of polyester polymers. The metallic nickel particles may also be added to the polyester polymer which is in the form of solid-stated pellets, or to an injection molding machine for the manufacture of preforms from the polyester polymers.

DETAILED DESCRIPTION OF THE INVENTION

Figure 1:
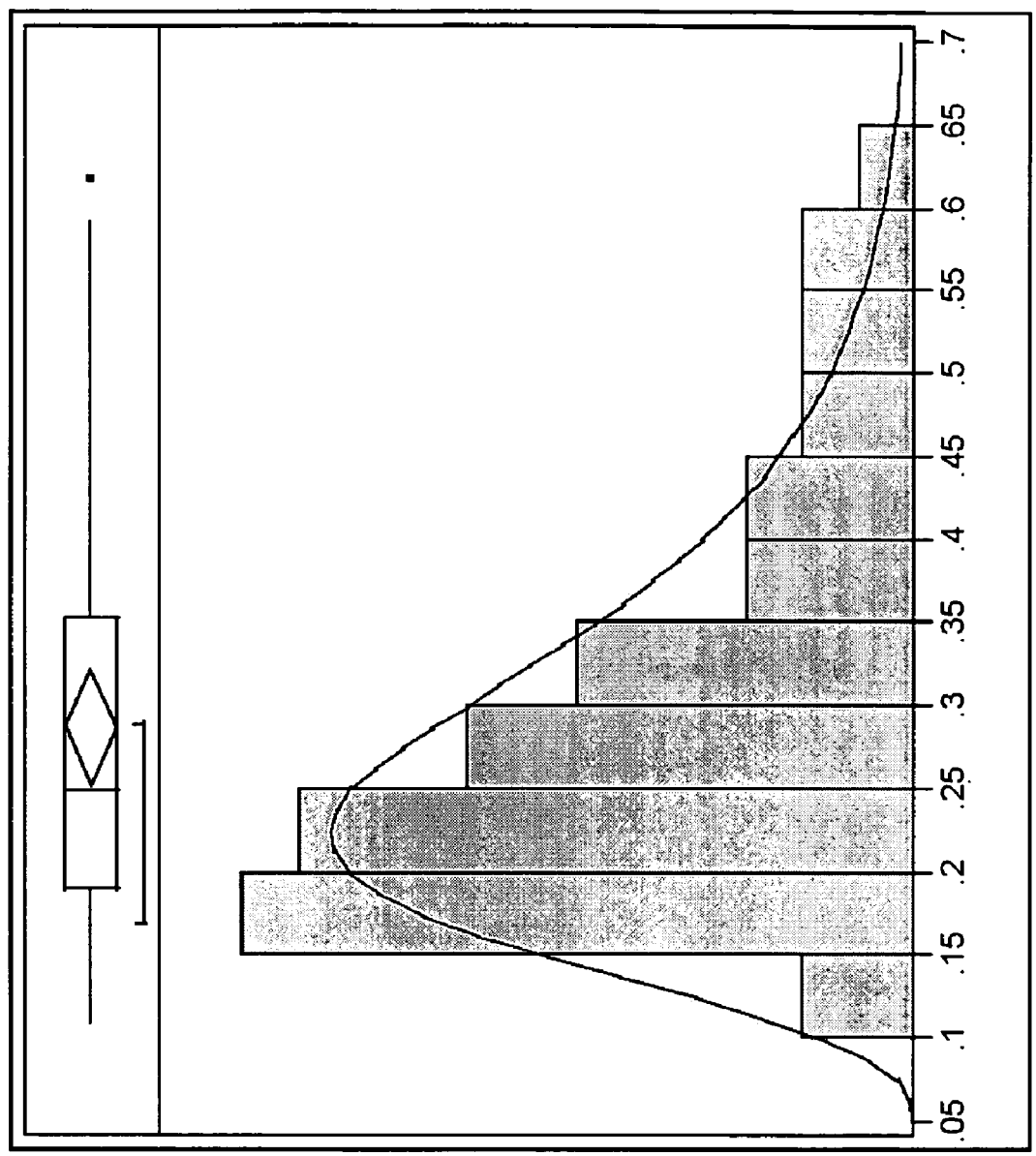
FIG. 1 depicts nickel particle size distribution of the sample used in Examples 1 through 4 as revealed by scanning electron microscopy.

The present invention may be understood more readily by reference to the following detailed description of the invention, including the appended figures, and to the examples provided. It is to be understood that this invention is not limited to the specific processes and conditions described, because specific processes and process conditions for processing plastic articles may vary. It is also to be understood that the terminology used is for the purpose of describing particular embodiments only and is not intended to be limiting.

As used in the specification and the claims, the singular forms "a," "an," and "the" include plural referents unless the context clearly dictates otherwise. For example, reference to processing a thermoplastic "preform," "container" or "bottle" is intended to include the processing of a plurality of thermoplastic preforms, articles, containers, or bottles.

By "comprising" or "containing" we mean that at least the named compound, element, particle, etc. must be present in the composition or article, but does not exclude the presence of other compounds, materials, particles, etc., even if the other such compounds, material, particles, etc. have the same function as what is named.

As used herein, a "$d_{50}$ particle size" is the median diameter, where 50% of the volume is composed of particles larger than the stated $d_{50}$ value, and 50% of the volume is composed of particles smaller than the stated $d_{50}$ value. As used herein, the median particle size is the same as the $d_{50}$ particle size.

According to the invention, metallic nickel particles are used in which the nickel metal is provided in the elemental state. These particles are to be distinguished from nickel compounds, including nickel (II) compounds or complexes. Nickel compounds are further described in Kirk-Othmer *Encyclopedia of Chemical Technology*, Vol 17, 4th ed., (1995) pp. 18-42, incorporated herein by reference. Thus nickel compounds which may be used as condensation catalysts, for example, nickel acetate, nickel formate or nickel benzoate, are not intended to fall within the definition of metallic nickel particles. That is, if nickel (II) compounds are used as condensation catalysts to form the polymer in the compositions of the claimed invention, such polymers will additionally contain metallic nickel particles in the elemental state, as further described herein. Nickel and nickel alloys are further described in Kirk-Othmer *Encyclopedia of Chemical Technology*, Vol. 17, 4th ed., (1995) pp. 1-17, incorporated herein by reference, The metallic nickel particles useful according to the claimed invention may predominantly comprise, in terms of weight percent, elemental nickel metal, with typical impurities, in which the nickel metal may be predominantly elemental nickel, or a nickel metal alloy in which nickel may be alloyed with one or more other metals, semi-metals, and/or non-metals, so long as the alloys substantially retain the metallic properties of nickel.

Further, the phase or phases present in the metallic nickel alloy particles according to the invention may include amorphous phases, solid solution phases, or intermetallic compound phase solid solutions, and may thus be distinguished from compositions comprised predominantly of nickel compounds such as those in which the nickel has a higher oxidation state, although the alloys may, of course, include compounds of nickel that result from the alloying process, again so long as the alloys substantially retain their metallic properties.

Alloys useful according to the invention thus include those in which nickel and one or more other metals or nonmetals are intimately mixed with nickel, such as when molten, so that they are fused together and dissolved with each other to form, at least in part, a solid solution. We do not mean, of course, to exclude nickel alloys that have measurable amounts of nickel compounds present, up to about 50 wt. %, so long as such alloys retain substantial metallic properties, and in any event, the nickel present substantially retains its metallic properties, the presence of nickel compounds in the alloy notwithstanding.

Alloys are thus suitable for use according to the invention so long as such alloys comprise at least 20 wt. % nickel metal, or at least 30 wt. % nickel, or at least 50 wt. % nickel, or at least 60 wt. % nickel, or at least 90 wt. % nickel, or at least 95 wt. % nickel, as determined, for example, by elemental analysis, especially when the nickel is the major alloying element. Not wishing to be bound by any theory, we believe that the effectiveness of nickel as a reheat additive may be a function of the absorptive properties of the nickel itself, such as the optical constants in the wavelength of interest, so that nickel alloys are also suitable for use according to the invention, so long as such alloys have a significant amount of nickel, such as the minimum amounts of nickel as already described.

The metallic nickel particles may thus be elemental nickel, or may be a nickel metal alloy in which nickel is alloyed with one or more other materials, such as other metals, so long as such other materials do not substantially affect the ability of the particles to increase the reheat properties of the polymer compositions.

We note that nickel metal particles can be produced by numerous techniques, as described in the Powder Metallurgy entry in Kirk-Othmer *Encyclopedia of Chemical Technology*, Vol 16, 4th ed., (1995) pp. 353-392, incorporated herein by reference. For example, the nickel metal particles according to the invention may be formed by atomization, reduction, decomposition, electrolytic deposition, precipitation, electrode spinning, high energy impaction, mechanical comminution, condensation, decomposition of metal hydrides, or rapid solidification technology.

In the atomization technique, a stream of molten metal is struck with water or air jet and the particles formed are collected, sieved, and annealed. In the reduction method, metal oxide is reduced in a solid or gaseous media. The decomposition method produces a fine powder of metal by the decomposition of liquid or gaseous carbonyls. Electrolytic decomposition from molten salts or solutions produces metal powder directly, or else produces an adherent mass that may be mechanically comminuted. In the precipitation process, nickel ammonium carbonate gives nickel powder when subjected to hydrogen in an autoclave. In the electrode spinning method, molten metal droplets are produced that are centrifuged in a closed chamber. In the high energy impact method, brittle coarse shapes are impinged against a tungsten carbide target at high velocities. Mechanical comminution techniques can produce relatively coarse particles by machining, or can produce fine particles by methods such as ball milling, impact milling, gyratory crushing, or eddy milling. Metal powders can be formed by condensation of metal vapors on cool surfaces. Metal hydrides can be decomposed by vacuum treatment to give powders of fine particle sizes. In rapid solidification technology, molten metal is quench cast as a continuous ribbon which is subsequently pulverized to an amorphous powder.

Shapes of metallic nickel powder which can be used in this invention include, but are not limited to, the following: acicular powder, angular powder, dendritic powder, equi-axed powder, flake powder, fragmented powder, granular powder, irregular powder, nodular powder, platelet powder, porous powder, rounded powder, and spherical powder. The particles may be of a filamentary structure, where the individual particles may be loose aggregates of smaller particles attached to form a bead or chain-like structure. The overall size of the particles may be variable, due to a variation in chain length and degree of branching.

Metallic nickel particles useful according to the invention for the improvement of reheat and color in polyester compositions include those having a range of particle sizes and particle size distributions, although we have found certain particle sizes and relatively narrow particle size distributions to be especially suitable in certain applications. For example, in some embodiments, especially those in which the polyester comprises PET, metallic nickel particles having a median particle size of about 0.12 micrometers (µm), and a relatively narrow particle size distribution, are advantageous.

The size of the metallic nickel particles may thus vary within a broad range depending on the method of production, and the numerical values for the particle sizes may vary according to the shape of the particles and the method of measurement. Particle sizes useful according to the invention may be from about 0.005 µm to about 10 µm, or from 0.05 µm to 1 µm, or from 0.05 µm to 0.9 µm. When the polyester composition comprises PET, we have found that particle sizes from 0.08 µm to 1.1 µm are especially suitable.

The particles useful according to the invention may likewise be nickel hollow spheres or nickel-coated spheres, in which the core is comprised of nickel, of mixtures of nickel with other materials, or of other materials in the substantial absence of nickel. Again, not being bound by any theory, we think it likely that the effectiveness of nickel as a reheat additive is a function of the absorptive properties of the nickel itself, so that nickel-coated particles are suitable for use according to the invention, so long as the coating thickness of nickel is sufficient to provide adequate reheat properties. Thus, in various embodiments, the thickness of the coating may be from about 0.005 µm to about 10 µm, or from 0.01 µm to 5 µm, or from 0.10 µm to 0.5 µm. Such nickel coatings may also comprise nickel alloys, as already described.

Metal particles, which have a mean particle size suitable for the invention, may have irregular shapes and form chain-like structures, although roughly spherical particles may be preferred. The particle size and particle size distribution may be measured by methods such as those described in the Size Measurement of Particles entry of Kirk-Othmer *Encyclopedia of Chemical Technology,* 4th ed., Vol. 22, pp. 256-278, incorporated herein by reference. For example, particle size and particle size distributions may be determined using a Fisher Subsieve Sizer or a Microtrac Particle-Size Analyzer manufactured by Leeds and Northrop Company, or by microscopic techniques, such as scanning electron microscopy or transmission electron microscopy.

The amount of metallic nickel particles present in the polyester compositions according to the invention may vary within a wide range, for example from about 0.5 ppm to about 1,000 ppm, or from 1 ppm to 500 ppm, or from 5 ppm to 100 ppm, or from 5 ppm to 50 ppm. Thermoplastic concentrates according to the invention may, of course, have amounts greater than these, as further described elsewhere herein.

The metallic nickel particles according to the claimed invention may be pure nickel, or may be particles coated with nickel, or may be nickel alloyed with one or more other metals. Metals that can be alloyed with nickel in amounts up to 50 wt. % or more include germanium, iron, chromium, tungsten, molybdenum, titanium, vanadium, carbon, and tantalum. Metals that can be present in minor amounts, for example up to 10 wt. % or more, include gold, silver, copper, aluminum, manganese, and silicon.

The metallic nickel particles may thus be elemental nickel, or may include other materials, such as other metals, so long as such other materials do not substantially affect the ability of the particles to increase the reheat properties of the polymer compositions.

The nickel metal particles can be coated with a fine layer of nickel oxide or other coating, so long as the oxide coating does not substantially affect the ability of the nickel particles to increase the reheat efficiency of the polymer compositions.

The particles may likewise be nickel hollow spheres or nickel-coated spheres, in which the core is comprised of nickel, of mixtures of nickel with other materials, or of other materials in the substantial absence of nickel. Again, not being bound by any theory, we think it likely that the effectiveness of nickel as a reheat additive is a function of the absorptive properties of the nickel itself, so that nickel-coated particles are suitable for use according to the invention, so long as the coating thickness is sufficient to provide adequate reheat properties. Thus, in various embodiments, the thickness of the coating may be from about 0.005 µm to about 10 µm, or from 0.01 µm to 5 µm, or from 0.10 µm to 0.5 µm. Such nickel coatings may also comprise nickel alloys, as already described.

A range of particle size distributions may be useful according to the invention. The particle size distribution, as used herein, may be expressed by "span (S)," where S is calculated by the following equation:

$$S = \frac{d_{90} - d_{10}}{d_{50}}$$

where $d_{90}$ represents a particle size in which 90% of the volume is composed of particles smaller than the stated $d_{90}$; and $d_{10}$ represents a particle size in which 10% of the volume is composed of particles smaller than the stated $d_{10}$; and $d_{50}$ represents a particle size in which 50% of the volume is composed of particles larger than the stated $d_{50}$ value, and 50% of the volume is composed of particles smaller than the stated $d_{50}$ value.

Thus, particle size distributions in which the span (S) is from 0 to 10, or from 0 to 5, or from 0.01 to 2, may be used according to the invention.

In order to obtain a good dispersion of metallic nickel particles in the polyester compositions, a concentrate, containing for example about 500 ppm metallic nickel particles, may be prepared using a polyester such as a commercial grade of PET. The concentrate may then be let down into a polyester at the desired concentration, ranging, for example, from 1 ppm to 500 ppm.

During the solid-state polymerization process (SSP), oxygen can sometimes be introduced into the process unintentionally. When antimony metal is used as the reheat additive, this oxygen leak can cause a portion of the antimony metal to re-oxidize to antimony oxide. It the leak is large, it can even cause all of the antimony metal to oxidize. When re-oxidation occurs, the reheat rate of the polyester drops, because antimony oxide does not absorb infrared energy as readily as antimony metal. Thus, the polymer produced has a variable reheat rate due to the presence of the oxygen leak. This causes problems in the bottle reheat blow molding process since constant adjustments must be made to the reheat lamp settings in order to compensate for the variation in preform reheat rates.

We have found that the polyester compositions of this invention which contain nickel particles as the reheat additive do not suffer from the problem of re-oxidation in the presence of an oxygen leak during solid-stating, as is the case with antimony metal particles. Thus, the reheat rate will tend to be less variable with nickel metal particles, and fewer adjustments will need to be made to the lamp settings during the reheat blow molding process.

The amount of metallic nickel particles used in the polyester will depend upon the particular application, the desired reduction in reheat time, and the toleration level in the reduction of a* and b* away from zero along with the movement of L* brightness values away from 100. Thus, in various embodiments, the quantity of metallic nickel particles may be at least 1 ppm, or at least 5 ppm, or at least 50 ppm. In many applications, the quantity of metallic nickel particles may be at least 50 ppm, in some cases at least 60 ppm, and even at least 70 ppm. The maximum amount of metallic nickel particles may be limited by one or more of the desired reheat rate, or maintenance in L*, b* and haze, which may vary among applications or customer requirements. In some embodiments, the amount may not exceed 500 ppm, or may be at or below 300 ppm, or may not exceed 250 ppm. In those applications where color, haze, and brightness are not important features to the application, however, the amount of metallic nickel particles used may be up to 1,000 ppm, or up to 5,000 ppm, or even up to 10,000 ppm. The amount can exceed 10,000 ppm when formulating a concentrate with metallic nickel particles as discussed elsewhere in this application.

The method by which the metallic nickel particles are incorporated into the polyester composition is not limited. The metallic nickel particles can be added to the polymer reactant system, during or after polymerization, to the polymer melt, or to the molding powder or pellets or molten polyester in the injection-molding machine from which the bottle preforms are made. They may be added at locations including, but not limited to, proximate the inlet to the esterification reactor, proximate the outlet of the esterification reactor, at a point between the inlet and the outlet of the esterification reactor, anywhere along the recirculation loop, proximate the inlet to the prepolymer reactor, proximate the outlet to the prepolymer reactor, at a point between the inlet and the outlet of the prepolymer reactor, proximate the inlet to the polycondensation reactor, or at a point between the inlet and the outlet of the polycondensation reactor.

The metallic nickel particles may be added to a polyester polymer, such as PET, and fed to an injection molding machine by any method, including feeding the metallic nickel particles to the molten polymer in the injection molding machine, or by combining the metallic nickel particles with a feed of PET to the injection molding machine, either by melt blending or by dry blending pellets.

Alternatively, the metallic nickel particles may be added to an esterification reactor, such as with and through the ethylene glycol feed optionally combined with phosphoric acid, to a prepolymer reactor, to a polycondensation reactor, or to solid pellets in a reactor for solid stating, or at any point in-between any of these stages. In each of these cases, the metallic nickel particles may be combined with PET or its precursors neat, as a concentrate containing PET, or diluted with a carrier. The carrier may be reactive to PET or may be non-reactive. The metallic nickel particles, whether neat or in a concentrate or in a carrier, and the bulk polyester, may be dried prior to mixing together. These may be dried in an atmosphere of dried air or other inert gas, such as nitrogen, and if desired, under sub-atmospheric pressure.

The impact of a reheat additive on the color of the polymer can be judged using a tristimulus color scale, such as the CIE L*a*b* scale. The L* value ranges from 0 to 100 and measures dark to light. The a* value measures red to green with positive values being red and negative values green. The b* value measures yellow to blue with yellow having positive values and blue negative values.

Color measurement theory and practice are discussed in greater detail in *Principles of Color Technology*, pp. 25-66 by Fred W. Billmeyer, Jr., John Wiley & Sons, New York (1981), incorporated herein by reference.

L* values for the polyester compositions as measured on twenty-ounce bottle preforms discussed herein should generally be greater than 60, more preferably at least 65, and more preferably yet at least 70, Specifying a particular L* brightness does not imply that a preform having a particular sidewall cross-sectional thickness is actually used, but only that in the event the L* is measured, the polyester composition actually used is, for purposes of testing and evaluating the L* of the composition, injection molded to make a preform having a sidewall cross-sectional thickness of 0.154 inches.

The color of a desirable polyester composition, as measured in twenty-ounce bottle preforms having a nominal sidewall cross-sectional thickness of 0.154 inches, is generally indicated by an a* coordinate value preferably ranging from about minus 2.0 to about plus 1.0, or from about minus 1.5 to about plus 0.5. With respect to a b* coordinate value, it is generally desired to make a bottle preform having a b* value coordinate ranging from minus 3.0 to positive value of less than plus 5.0, or less than plus 4.0, or less than plus 3.8.

Polyesters according to the invention having an acceptable bottle sidewall haze generally have a haze value, as measured on samples having a cross-sectional thickness of about 0.012 inches, of less than 6.0%, or less than 5.0%, or less than 4.0%, or 3.0% or less.

The measurements of L*, a* and b* color values are conducted according to the following method. The instrument used for measuring b* color should have the capabilities of a HunterLab UltraScan XE, model U3350, using the CIE Lab Scale (L*, a*, b*), D65 (ASTM) illuminant, 10° observer and an integrating sphere geometry. Clear plaques, films, preforms, bottles, and are tested in the transmission mode under ASTM D1746 "Standard Test Method for Transparency of Plastic Sheeting." The instrument for measuring color is set up under ASTM E1164 "Standard Practice for Obtaining Spectrophotometric Data for Object Color Evaluation."

More particularly, the following test methods can be used, depending upon whether the sample is a preform, or a bottle. Color measurements should be performed using a HunterLab UltraScan XE (Hunter Associates Laboratory, Inc., Reston Va.), which employs diffuse/8° (illumination/view angle) sphere optical geometry, or equivalent equipment with these same basic capabilities. The color scale employed is the CIE L*a*b* scale with D65 illuminant and 10° observer specified.

Preforms having a mean outer diameter of 0.846 inches and a wall thickness of 0.154 inches, and bottle sidewall sections having a wall thickness of 0.0115 inches to 0.012 inches are measured in regular transmission mode using ASTM D1746, "Standard Test Method for Transparency of Plastic Sheeting". Preforms are held in place in the instrument using a preform holder, available from HunterLab, and triplicate measurements are averaged, whereby the sample is rotated 90° about its center axis between each measurement.

The intrinsic viscosity (It.V.) values described throughout this description are set forth in dL/g unit as calculated from the inherent viscosity (Ih.V.) measured at 25° C in 60/40 wt/wt phenol/tetrachloroethane. The inherent viscosity is calculated from the measured solution viscosity. The following equations describe these solution viscosity measurements, and subsequent calculations to Ih.V. and from Ih.V. to It.V:

$$\eta_{inh} = [\ln(t_s/t_o)]/C$$

where $\eta_{inh}$=Inherent viscosity at 25° C. at a polymer concentration of 0.50 g/100 mL of 60% phenol and 40% 1,1,2,2-tetrachloroethane ln=Natural logarithm $t_s$=Sample flow time through a capillary tube $t_o$=Solvent-blank flow time through a capillary tube C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0} (\eta_{sp}/C) = \lim_{C \to 0} \ln(\eta_r/C)$$

where $\eta_{int}$=Intrinsic viscosity $\eta_r$=Relative viscosity=ts/to $\eta_{sp}$=Specific viscosity=$\eta_r$−1

Instrument calibration involves replicate testing of a standard reference material and then applying appropriate mathematical equations to produce the "accepted" I.V. values.

Calibration Factor=Accepted IV of Reference Material/Average of Replicate Determinations Corrected IhV=Calculated IhV×Calibration Factor The intrinsic viscosity (It.V. or $\eta_{int}$) may be estimated using the Billmeyer equation as follows:

$$\eta_{int} = 0.5[e^{0.5 \times Corrected\ Ihv} - 1] + (0.75 \times Corrected\ IhV)$$

Thus, a beneficial feature provided by polyester compositions containing metallic nickel particles is that the compositions and preforms made from these compositions have an improved reheat rate, as expressed by twenty-ounce bottle preform surface temperature (PST), relative to a control with no reheat additive. The higher the PST value, the higher the reheat rate.

In some embodiments, the polyester compositions containing metallic nickel particles, and preforms made from these compositions, may have a b* color of less than 4.0, or less than 3.8, or less than 3.7, and in any case greater than minus 3.0, even at loadings ranging from 100 ppm to 200 ppm. Similarly, preforms from the polyester compositions according to the invention may have an L* brightness of at least 60, or at least 65, or at least 70. The compositions may also result in an increase in bottle sidewall percent haze that is much less than compositions containing other types of reheat additives at the same levels of reheat rate. The sidewall bottle haze value measured at a thickness of 0.0125 inches (+/−0.004) may be 6.0% or less, or 5.0% or less, or even 4.0% or less.

We note that the polyester compositions according to the invention have improved solid-stating stability compared to polyester compositions containing conventional reheat additives. By solid-stating stability we mean that there is little or no change in the reheat rate after the polymer undergoes solid-state polymerization in the presence of an air leak during the process. Constant reheat rate is important for the bottle blowing process. If the reheat rate varies as a result of the oxidation of the reheat additive, as is the case with antimony metal, then constant adjustments must be made-to the oven power settings in order to maintain a consistent preform surface temperature from one preform to another.

According to the invention, in various embodiments, there are thus provided concentrate compositions comprising metallic nickel particles in an amount of at least 0.05 wt. %, or at least 2 wt. %, and up to about 20 wt. %, or up to 35 wt. %, and a thermoplastic polymer normally solid at 25° C. and 1 atm such as a polyester, polyolefin, or polycarbonate in an amount of at least 65 wt. %, or at least 80 wt. %, or up to 99 wt. % or more, each based on the weight of the concentrate composition. The concentrate may be in liquid, molten state, or solid form. The converter of polymer to preforms has the flexibility of adding metallic nickel particles to bulk polyester at the injection molding stage continuously, or intermittently, in liquid molten form or as a solid blend, and further adjusting the amount of metallic nickel particles contained in the preform by metering the amount of concentrate to fit the end use application and customer requirements.

The concentrate may be made by mixing metallic nickel particles with a polymer such as a polycarbonate, a polyester, a polyolefin, or mixtures of these, in a single or twin-screw extruder, and optionally compounding with other reheat additives. A suitable polycarbonate is bisphenol A polycarbonate. Suitable polyolefins include, but not limited to, polyethylene and polypropylene, and copolymers thereof. Melt temperatures should be at least as high as the melting point of the polymer. For a polyester, such as PET, the melt temperatures are typically in the range of 250°-310° C. Preferably, the melt compounding temperature is maintained as low as possible.

The extrudate may be withdrawn in any form, such as a strand form, and recovered according to the usual way such as cutting.

The concentrate may be prepared in a similar polyester as used in the final article. However, in some cases it may be advantageous to use another polymer in the concentrate, such as a polyolefin. In the case where a polyolefin/metallic nickel particles concentrate is blended with the polyester, the polyolefin can be incorporated as a nucleator additive for the bulk polyester.

The concentrate may be added to a bulk polyester or anywhere along the different stages for manufacturing PET, in a manner such that the concentrate is compatible with the bulk polyester or its precursors. For example, the point of addition or the It.V. of the concentrate may be chosen such that the It.V. of the polyethylene terephthalate and the It.V. of the concentrate are similar, e.g. +/−0.2 It.V. measured at 25° C. in a 60/40 wt/wt phenol/tetrachloroethane solution. A concentrate can be made with an It.V. ranging from 0.3 dL/g to 1.1 dL/g to match the typical It.V. of a polyethylene terephthalate under manufacture in the polycondensation stage. Alternatively, a concentrate can be made with an It.V. similar to that of solid-stated pellets used at the injection molding stage (e.g. It.V. from 0.6 dL/g to 1.1 dL/g).

Other components can be added to the polymer compositions of the present invention to enhance the performance properties of the polyester composition. For example, crystallization aids, impact modifiers, surface lubricants, denesting agents, stabilizers, antioxidants, ultraviolet light absorbing agents, catalyst deactivators, colorants, nucleating agents, acetaldehyde reducing compounds, other reheat enhancing aids, fillers, anti-abrasion additives, and the like can be included. The resin may also contain small amounts of branching agents such as trifunctional or tetrafunctional comonomers such as trimellitic anhydride, trimethylol propane, pyromellitic dianhydride, pentaerythritol, and other polyester forming polyacids or polyols generally known in the art. All of these additives and many others and their use are well known in the art. Any of these compounds can be used in the present composition.

The polyester compositions of the present invention may be used to form preforms used for preparing packaging containers. The preform is typically heated above the glass transition temperature of the polymer composition by passing the preform through a bank of quartz infrared heating lamps, positioning the preform in a bottle mold, and then blowing pressurized air through the open end of the mold.

A variety of other articles can be made from the polyester compositions of the invention. Articles include sheet, film, bottles, trays, other packaging, rods, tubes, lids, and injection molded articles. Any type of bottle can be made from the polyester compositions of the invention. Thus, in one embodiment, there is provided a beverage bottle made from PET suitable for holding water. In another embodiment, there is provided a heat-set beverage bottle suitable for holding beverages which are hot-filled into the bottle. In yet another embodiment, the bottle is suitable for holding carbonated soft drinks.

The metallic nickel particle reheat additives used in the invention affect the reheat rate, brightness and color of preforms, and the haze value of the bottles made from these preforms. Any one or more of these performance characteristics may be adjusted by varying the amount of reheat additive used, or by changing the particle size, or the particle size distribution.

The invention also provides processes for making polyester preforms that comprise feeding a liquid or solid bulk polyester and a liquid, molten or solid polyester concentrate composition to a machine for manufacturing the preform, the concentrate being as described elsewhere. According to the invention, not only may the concentrate be added at the stage for making preforms, but in other embodiments, there are provided processes for the manufacture of polyester compositions that comprise adding a concentrate polyester composition to a melt phase for the manufacture of virgin polyester polymers, the concentrate comprising metallic nickel particles and at least 65 wt. % of a polyester polymer. Alternatively, the nickel particles may be added to recycled PET.

The polyester compositions according to the invention have a good reheat rate with improved $L^*$ and $b^*$ ratings, and low bottle sidewall haze. The resulting polymers also have excellent solid stating stability.

In yet another embodiment of the invention, there is provided a polyester beverage bottle made from a preform, wherein the preform has a PST of 112° C. or more, and an $L^*$ value of 60 or more.

In each of the described embodiments, there are also provided additional embodiments encompassing the processes for the manufacture of each, and the preforms and articles, and in particular bottles, blow-molded from the preforms, as well as their compositions containing metallic nickel particles.

The polyester compositions of this invention may be any thermoplastic polymers, optionally containing any number of ingredients in any amounts, provided that the polyester component of the polymer is present in an amount of at least 30 wt. %, or at least 50 wt. %, or at least 80 wt. %, or even 90 wt. % or more, based on the weight of the polymer, the backbone of the polymer typically including repeating terephthalate or naphthalate units.

Examples of suitable polyester polymers include one or more of: PET, polyethylene naphthalate (PEN), poly(1,4-cyclo-hexylenedimethylene) terephthalate (PCT), poly(ethylene-co-1,4-cyclohexanedimethylene terephthalate) (PETG), copoly(1,4-cyclohexylene dimethylene/ethylene terephthalate) (PCTG) and their blends or their copolymers. The form of the polyester composition is not limited, and includes a melt in the manufacturing process or in the molten state after polymerization, such as may be found in an injection molding machine, and in the form of a liquid, pellets, preforms, and/or bottles. Polyester pellets may be isolated as a solid at 25° C. and 1 atm in order for ease of transport and processing. The shape of the polyester pellet is not limited, and is typified by regular or irregular shaped discrete particles and may be distinguished from a sheet, film, or fiber.

It should also be understood that as used herein, the term polyester is intended to include polyester derivatives, including, but not limited to, polyether esters, polyester amides, and polyetherester amides. Therefore, for simplicity, throughout the specification and claims, the terms polyester, polyether ester, polyester amide, and polyetherester amide may be used interchangeably and are typically referred to as polyester, but it is understood that the particular polyester species is dependant on the starting materials, i.e., polyester precursor reactants and/or components.

The location of the metallic nickel particles within the polyester compositions is not limited. The metallic nickel particles may be disposed anywhere on or within the polyester polymer, pellet, preform, or bottle. Preferably, the polyester polymer in the form of a pellet forms a continuous phase. By being distributed "within" the continuous phase we mean that the metallic nickel particles are found at least within a portion of a cross-sectional cut of the pellet. The metallic nickel particles may be distributed within the polyester polymer randomly, distributed within discrete regions, or distributed only within a portion of the polymer. In a preferred embodiment, the metallic nickel particles are disposed randomly throughout the polyester polymer composition as by way of adding the metallic nickel particles to a melt, or by mixing the metallic nickel particles with a solid polyester composition followed by melting and mixing.

The metallic nickel particles may be added in an amount so as to achieve a preform surface temperature of at least 112° C., or at least 115° C., or at least 120° C., while maintaining an L* brightness of 60 or more, when measured at a PST of 112° C.

Suitable amounts of metallic nickel particles in the polyester compositions (other than polyester concentrate compositions as discussed elsewhere), preforms, and containers, may thus range from about 0.5 ppm to about 500 ppm, based on the weight of the polymer in the polyester compositions, or as already described. The amount of the metallic nickel particles used may depend on the type and quality of the metallic nickel particles, the particle size, surface area, the morphology of the particle, and the level of reheat rate improvement desired.

The particle size may be measured with a laser diffraction type particle size distribution meter, or scanning or transmission electron microscopy methods. Alternatively, the particle size can be correlated by a percentage of particles screened through a mesh. Metallic nickel particles having a particle size distribution in which at least 80%, preferably at least 90%, more preferably at least 95% of the particles fall through an ASTM-E11 140 sieve are suitable for use as reheat agents. Metallic nickel particles having a particle size distribution in which at least 80%, preferably at least 90%, more preferably at least 95% of the particles fall through a ASTM-E11 325 sieve are also suitable for use as reheat agents.

The metallic nickel particles used in the invention not only enhance the reheat rate of a preform, but have only a minimal impact on the brightness of the preforms and bottles by not reducing the L* below acceptable levels. An acceptable L* value of preforms or bottles is deemed 60 or more when measured at a PST of 112° C.

In various other embodiments, there are provided polyester compositions, whether in the form of a melt, pellets, sheets, preforms, and/or bottles, comprising at least 0.5 ppm, or at least 50 ppm, or at least 100 ppm metallic nickel particles, having a $d_{50}$ particle size of less than 100 µm, or less than 50 µm, or less than 1 µm or less, wherein the polyester compositions have an L* value of 60 or more, or 68 or more, or even 70 or more, when measured at a PST of 112° C., or 115° C., or 120° C.

According to various embodiments of the invention, metallic nickel particles may be added at any point during polymerization, which includes to the esterification zone, to the polycondensation zone comprised of the prepolymer zone and the finishing zone, to or prior to the pelletizing zone, and at any point between or among these zones. The metallic nickel particles may also be added to solid-stated pellets as they are exiting the solid-stating reactor. Furthermore, metallic nickel particles may be added to the PET pellets in combination with other feeds to the injection molding machine, or may be fed separately to the injection molding machine. For clarification, the metallic nickel particles may be added in the melt phase or to an injection molding machine without solidifying and isolating the polyester composition into pellets. Thus, the metallic nickel particles can also be added in a melt-to-mold process at any point in the process for making the preforms. In each instance at a point of addition, the metallic nickel particles can be added as a powder neat, or in a liquid, or a polymer concentrate, and can be added to virgin or recycled PET, or added as a polymer concentrate using virgin or recycled PET as the PET polymer carrier.

In other embodiments, the invention relates to processes for the manufacture of polyester compositions containing metallic nickel particles, such as polyalkylene terephthalate or naphthalate polymers made by transesterifying a dialkyl terephthalate or dialkyl naphthalate or by directly esterifying terephthalic acid or naphthalene dicarboxylic acid.

Thus, there are provided processes for making polyalkylene terephthalate or naphthalate polymer compositions by transesterifying a dialkyl terephthalate or naphthalate or directly esterifying a terephthalic acid or naphthalene dicarboxylic acid with a diol, adding metallic nickel particles to the melt phase for the production of a polyalkylene terephthalate or naphthalate after the prepolymer zone, or to polyalkylene terephthalate or naphthalate solids, or to an injection molding machine for the manufacture of bottle preforms.

Each of these process embodiments, along with a description of the polyester polymers, is now explained in further detail.

The polyester polymer may be PET, PEN, or copolymers or mixtures, thereof. A preferred polyester polymer is polyethylene terephthalate. As used herein, a polyalkylene terephthalate polymer or polyalkylene naphthalate polymer means a polymer having polyalkylene terephthalate units or polyalkylene naphthalate units in an amount of at least 60 mole % based on the total moles of units in the polymer, respectively. Thus, the polymer may contain ethylene terephthalate or naphthalate units in an amount of at least 85 mole %, or at least 90 mole %, or at least 92 mole %, or at least 96 mole %, as measured by the mole % of ingredients added to the reaction mixture. Thus, a polyethylene terephthalate polymer may comprise a copolyester of ethylene terephthalate units and other units derived from an alkylene glycol or aryl glycol with an aliphatic or aryl dicarboxylic acid.

While reference is made in certain instances to polyethylene terephthalate, it is to be understood that the polymer may also be a polyalkylene naphthalate polymer or another polyester described herein.

Polyethylene terephthalate can be manufactured by reacting a diacid or diester component comprising at least 60 mole % terephthalic acid or $C_1$-$C_4$ dialkylterephthalate, or at least 70 mole %, or at least 85 mole %, or at least 90 mole %, and for many applications at least 95 mole %, and a diol component comprising at least 60 mole % ethylene glycol, or at least 70 mole %, or at least 85 mole %, or at least 90 mole %, and for many applications, at least 95 mole %. It is preferable that the diacid component is terephthalic acid and the diol component is ethylene glycol. The mole percentage for all the diacid component(s) totals 100 mole %, and the mole percentage for all the diol component(s) totals 100 mole %.

The polyester pellet compositions may include admixtures of polyalkylene terephthalates, PEN, or mixtures thereof, along with other thermoplastic polymers, such as polycarbonates and polyamides. It is preferred in many instances that the polyester composition comprise a majority of a polyalkylene terephthalate polymers or PEN polymers, or in an amount of at least 80 wt. %, or at least 95 wt. %, based on the weight of polymers (excluding fillers, compounds, inorganic compounds or particles, fibers, impact modifiers, or other polymers which may form a discontinuous phase). In addition to units derived from terephthalic acid, the acid component of the present polyester may be modified with, or replaced by, units derived from one or more other dicarboxylic acids, such as aromatic dicarboxylic acids preferably having from 8 to 14 carbon atoms, aliphatic dicarboxylic acids preferably having 4 to 12 carbon atoms, or cycloaliphatic dicarboxylic acids preferably having 8 to 12 carbon atoms.

Examples of dicarboxylic acid units useful for the acid component are units from phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being preferable.

It should be understood that use of the corresponding acid anhydrides, esters, and acid chlorides of these acids is included in the term "dicarboxylic acid".

In addition to units derived from ethylene glycol, the diol component of the present polyester may be modified with, or replaced by, units from other diols including cycloaliphatic diols preferably having 6 to 20 carbon atoms and aliphatic diols preferably having 2 to 20 carbon atoms. Examples of such diols include diethylene glycol (DEG); triethylene glycol; 1,4-cyclohexanedimethanol; propane-1,3-diol; butane-1, 4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1, 3); hexanediol-(1,3); 1,4-di-(hydroxyethoxy)benzene; 2,2-bis-(4-hydroxycyclohexyl)propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

The polyester compositions of the invention may be prepared by conventional polymerization procedures well-known in the art sufficient to effect esterification and polycondensation. Polyester melt phase manufacturing processes include direct condensation of a dicarboxylic acid with a diol optionally in the presence of esterification catalysts in the esterification zone, followed by polycondensation in the prepolymer and finishing zones in the presence of a polycondensation catalyst; or else ester interchange usually in the presence of a transesterificaton catalyst in the esterificaton zone, followed by prepolymerization and finishing in the presence of a polycondensation catalyst, and each may optionally be subsequently solid-stated according to known methods. After melt phase and/or solid-state polycondensation the polyester polymer compositions typically have an intrinsic viscosity (It.V.) ranging from 0.55 dL/g to about 0.70 dL/g as precursor pellets, and an It.V. ranging from about 0.70 dL/g to about 1.1 dL/g for solid stated pellets.

To further illustrate, a mixture of one or more dicarboxylic acids, preferably aromatic dicarboxylic acids, or ester forming derivatives thereof, and one or more diols, are continuously fed to an esterification reactor operated at a temperature of between about 200° C. and 300° C., typically between 240° C. and 290° C., and at a pressure of about 1 psig up to about 70 psig. The residence time of the reactants typically ranges from between about one and five hours. Normally, the dicarboxylic acid is directly esterified with diol(s) at elevated pressure and at a temperature of about 240° C. to about 270° C. The esterification reaction is continued until a degree of esterification of at least 60% is achieved, but more typically until a degree of esterification of at least 85% is achieved to make the desired monomer. The esterification monomer reaction is typically uncatalyzed in the direct esterification process and catalyzed in transesterification processes. Polycondensation catalysts may optionally be added in the esterification zone along with esterification/transesterification catalysts.

Typical esterification/transesterification catalysts which may be used include titanium alkoxides, dibutyl tin dilaurate, used separately or in combination, optionally with zinc, manganese, or magnesium acetates or benzoates and/or other such catalyst materials as are well known to those skilled in the art. Phosphorus-containing compounds and cobalt compounds may also be present in the esterification zone. The resulting products formed in the esterification zone include bis(2-hydroxyethyl) terephthalate (BHET) monomer, low molecular weight oligomers, DEG, and water as the condensation by-product, along with other trace impurities formed by the reaction of the catalyst and other compounds such as colorants or the phosphorus-containing compounds. The relative amounts of BHET and oligomeric species will vary depending on whether the process is a direct esterification process, in which case the amount of oligomeric species are significant and even present as the major species, or a transesterification process, in which case the relative quantity of BHET predominates over the oligomeric species. The water is removed as the esterification reaction proceeds and excess ethylene glycol is removed to provide favorable equilibrium conditions. The esterification zone typically produces the monomer and oligomer mixture, if any, continuously in a series of one or more reactors. Alternatively, the monomer and oligomer mixture could be produced in one or more batch reactors.

It is understood, however, that in a process for making PEN, the reaction mixture will contain monomeric species such as bis(2-hydroxyethyl) naphthalate and its corresponding oligomers. Once the ester monomer is made to the desired degree of esterification, it is transported from the esterification reactors in the esterification zone to the polycondensation zone comprised of a prepolymer zone and a finishing zone.

Polycondensation reactions are initiated and continued in the melt phase in a prepolymerization zone and finished in the melt phase in a finishing zone, after which the melt may be solidified into precursor solids in the form of chips, pellets, or any other shape. For convenience, solids are referred to as pellets, but it is understood that a pellet can have any shape, structure, or consistency. If desired, the polycondensation reaction may be continued by solid-stating the precursor pellets in a solid-stating zone.

Although reference is made to a prepolymer zone and a finishing zone, it is to be understood that each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors or even one or more reaction steps or sub-stages performed in a single reactor vessel. In some reactor designs, the prepolymerization zone represents the first half of polycondensation in terms of reaction time, while the finishing zone represents the second half of polycondensation. While other reactor designs may adjust the residence time between the prepolymerization zone to the finishing zone at about a 2:1 ratio, a common distinction in all designs between the prepolymerization zone and the finishing zone is that the latter zone operates at a higher temperature, lower pressure, and a higher surface renewal rate than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

In the prepolymerization zone, also known in the industry as the low polymerizer, the low molecular weight monomers and minor amounts of oligomers are polymerized via polycondensation to form polyethylene terephthalate polyester (or PEN polyester) in the presence of a catalyst. If the catalyst was not added in the monomer esterification stage, the catalyst is added at this stage to catalyze the reaction between the monomers and low molecular weight oligomers to form prepolymer and split off the diol as a by-product. If a polycondensation catalyst was added to the esterification zone, it is typically blended with the diol and fed into the esterification reactor as the diol feed. Other compounds such as phosphorus-containing compounds, cobalt compounds, and colorants can also be added in the prepolymerization zone. These compounds may, however, be added in the finishing zone instead of or in addition to the prepolymerization zone.

In a typical DMT-based process, those skilled in the art recognize that other catalyst material and points of adding the catalyst material and other ingredients vary from a typical direct esterification process.

Typical polycondensation catalysts include the compounds of antimony, titanium, germanium, zinc and tin in an amount ranging from 0.1 ppm to 1,000 ppm based on the weight of resulting polyester polymer. A common polymerization catalyst added to the prepolymerization zone is an antimony-based polymerization catalyst. Suitable antimony-based catalysts include antimony (III) and antimony (V) compounds recognized in the art, and in particular, diol-soluble antimony (III) and antimony (V) compounds with antimony (III) being most commonly used. Other suitable compounds include those antimony compounds that react with, but are not necessarily soluble in, the diols, with examples of such compounds including antimony (III) oxide. Specific examples of suitable antimony catalysts include antimony (III) oxide and antimony (III) acetate, antimony (III) glycolates, antimony (III) ethyleneglycoxide and mixtures thereof, with antimony (III) oxide being preferred. The preferred amount of antimony catalyst added is that effective to provide a level of between about 75 ppm and about 400 ppm of antimony by weight of the resulting polyester.

This prepolymer polycondensation stage generally employs a series of two or more vessels and is operated at a temperature of between about 250° C. and 305° C. for between about one and four hours. During this stage, the It.V. of the monomers and oligomers is typically increased up to about no more than 0.35 dL/g. The diol byproduct is removed from the prepolymer melt using an applied vacuum ranging from 15 torr to 70 torr to drive the reaction to completion. In this regard, the polymer melt is typically agitated to promote the escape of the diol from the polymer melt and to assist the highly viscous polymer melt in moving through the polymerization vessels. As the polymer melt is fed into successive vessels, the molecular weight and thus the intrinsic viscosity of the polymer melt increases. The temperature of each vessel is generally increased and the pressure decreased to allow for a greater degree of polymerization in each successive vessel. However, to facilitate removal of glycols, water, alcohols, aldehydes, and other reaction products, the reactors are typically run under a vacuum or purged with an inert gas. Inert gas is any gas which does not cause unwanted reaction or product characteristics at reaction conditions. Suitable gases include, but are, not limited to, carbon dioxide, argon, helium, and nitrogen.

Once an It.V. of typically no greater than 0.35 dL/g is obtained, the prepolymer is fed from the prepolymer zone to a finishing zone where the second half of polycondensation is continued in one or more finishing vessels ramped up to higher temperatures than present in the prepolymerization zone, to a value within a range of from 280° C. to 305° C. until the It.V. of the melt is increased from the It.V of the melt in the prepolymerization zone (typically 0.30 dL/g but usually not more than 0.35 dL/g) to an It.V in the range of from about 0.50 dL/g to about 0.70 dL/g. The final vessel, generally known in the industry as the "high polymerizer," "finisher," or "polycondenser," is operated at a pressure lower than used in the prepolymerization zone, typically within a range of between about 0.8 torr and 4.0 torr. Although the finishing zone typically involves the same basic chemistry as the prepolymer zone, the fact that the size of the molecules, and thus the viscosity, differs, means that the reaction conditions also differ. However, like the prepolymer reactor, each of the finishing vessel(s) is connected to a flash vessel and each is typically agitated to facilitate the removal of ethylene glycol.

The residence time in the polycondensation vessels and the feed rate of the ethylene glycol and terephthalic acid into the esterification zone in a continuous process is determined in part based on the target molecular weight of the polyethylene terephthalate polyester. Because the molecular weight can be readily determined based on the intrinsic viscosity of the polymer melt, the intrinsic viscosity of the polymer melt is generally used to determine polymerization conditions, such as temperature, pressure, the feed rate of the reactants, and the residence time within the polycondensation vessels.

Once the desired It.V. is obtained in the finisher, the melt is fed to a pelletization zone where it is filtered and extruded into the desired form. The polyester polymers of the present invention are filtered to remove particulates over a designated size, followed by extrusion in the melt phase to form polymer sheets, filaments, or pellets. Although this zone is termed a "pelletization zone," it is understood that this zone is not limited to solidifying the melt into the shape of pellets, but includes solidification into any desired shape. Preferably, the polymer melt is extruded immediately after polycondensation. After extrusion, the polymers are quenched, preferably by spraying with water or immersing in a water trough, to promote solidification. The solidified condensation polymers are cut into any desired shape, including pellets.

As known to those of ordinary skill in the art, the pellets formed from the condensation polymers, in some circumstances, may be subjected to a solid-stating zone wherein the solids are first crystallized followed by solid-state polymerization (SSP) to further increase the It.V. of the polyester composition solids from the It.V exiting the melt phase to the desired It.V. useful for the intended end use. Typically, the It.V. of solid stated polyester solids ranges from 0.70 dL/g to 1.15 dL/g. In a typical SSP process, the crystallized pellets are subjected to a countercurrent flow of nitrogen gas heated to 180° C. to 220° C., over a period of time as needed to increase the It.V. to the desired target.

Thereafter, polyester polymer solids, whether solid stated or not, are re-melted and re-extruded to form items such as containers (e.g., beverage bottles), filaments, films, or other applications. At this stage, the pellets are typically fed into an injection molding machine suitable for making preforms which are stretch blow molded into bottles.

As noted, metallic nickel particles may be added at any point in the melt phase or thereafter, such as to the esterification zone, to the prepolymerization zone, to the finishing zone, or to the pelletizing zone, or at any point between each of these zones, such as to metering devices, pipes, and mixers. The metallic nickel particles can also be added to the pellets in a solid stating zone within the solid stating zone or as the pellets exit the solid-stating reactor. Furthermore, the metallic nickel particles may be added to the pellets in combination with other feeds to the injection molding machine or fed separately to the injection molding machine.

If the metallic nickel particles are added to the melt phase, it is desirable to use particles having a small enough $d_{50}$ particle size to pass through the filters in the melt phase, and in particular the pelletization zone. In this way, the particles will not clog up the filters as seen by an increase in gear pump pressure needed to drive the melt through the filters. However, if desired, the metallic nickel particles can be added after the pelletization zone filter and before or to the extruder.

Thus, according to the invention, metallic nickel particles of a wide range of $d_{50}$ particle sizes can be added either together with a phosphorus-containing compound to the esterification zone, the prepolymer zone, or at any point in between, or after the addition of a phosphorus compound to the esterification zone prior to completing the esterification reaction to the desired degree, or after the addition of the phosphorus compound to any zone and to a reaction mixture containing an active phosphorus compound. The point at which the metallic nickel particles are added, or the presence or absence of such other active compounds in the melt, is not limited since the metallic nickel particles function to enhance the rate of reheat. The function of the metallic nickel particles as a reheat enhancing additive allows a wide operating window and flexibility to add the metallic nickel particles at any convenient point, even in the presence of active phosphorus-containing compounds in the melt phase.

Thus, the metallic nickel particles may be added together with phosphorus compounds either as a mixture in a feedstock stream to the esterification or prepolymer zone, or as separate feeds but added to the reaction mixture within the zone simultaneously. Alternatively, the metallic nickel particles may be added to a reaction mixture within the esterification zone after a phosphorus compound has been added to the same zone and before completion of the esterification reaction.

Typical phosphorus-containing compounds added in the melt phase include acidic phosphorus-containing compounds recognized in the art. Suitable examples of such additives include phosphoric acid, phosphorous acid, polyphosphoric acid, carboxyphosphonic acids, and each of their derivatives including acidic phosphate esters such as phosphate mono- and di-esters and non-acidic phosphate esters such as trimethyl phosphate, triethyl phosphate, tributyl phosphate, tributoxyethyl phosphate, tris(2-ethylhexyl) phosphate, trioctyl phosphate, triphenyl phosphate, tritolyl phosphate, ethylene glycol phosphate, triethyl phosphonoacetate, dimethyl methyl phosphonate, tetraisopropyl methylenediphosphonate, mixtures of mono-, di-, and tri-esters of phosphoric acid with ethylene glycol, diethylene glycol, and 2-ethylhexanol, or mixtures of each, among others.

In addition to adding metallic nickel particles to virgin polymer, whether to make a concentrate or added neat to the melt phase after the prepolymerization reactors or to an injection molding zone, metallic nickel particles may also be added to post-consumer recycle (PCR) polymer. PCR containing metallic nickel particles is added to virgin bulk polymers by solid/solid blending or by feeding both solids to an extruder. Alternatively, PCR polymers containing metallic nickel particles are advantageously added to the melt phase for making virgin polymer between the prepolymerization zone and the finishing zone. The It.V. of the virgin melt phase after the prepolymerization zone is sufficiently high at that point to enable the PCR to be melt blended with the virgin melt. Alternatively, PCR may be added to the finisher. In either case, the PCR added to the virgin melt phase may contain the metallic nickel particles. The metallic nickel particles may be combined with PCR by any of the methods noted above, or separately fed to and melt blended in a heated vessel, followed by addition of the PCR melt containing the metallic nickel particles to the virgin melt phase at these addition points.

Other components can be added to the compositions of the present invention to enhance the performance properties of the polyester polymers. For example, crystallization aids, impact modifiers, surface lubricants, denesting agents, compounds, antioxidants, ultraviolet light absorbing agents, catalyst deactivators, colorants, nucleating agents, acetaldehyde reducing compounds, other reheat rate enhancing aids, sticky bottle additives such as talc, and fillers and the like can be included. The polymer may also contain small amounts of branching agents such as trifunctional or tetrafunctional comonomers such as trimellitic anhydride, trimethylol propane, pyromellitic dianhydride, pentaerythritol, and other polyester forming polyacids or diols generally known in the art. All of these additives and many others and their use are well known in the art and do not require extensive discussion. Any of these compounds can be used in the present composition. It is preferable that the present composition be essentially comprised of a blend of thermoplastic polymer and metallic nickel particles, with only a modifying amount of other ingredients being present.

Examples of other reheat rate enhancing additives that may be used in combination with metallic nickel particles include carbon black, antimony metal, tin, copper, silver, gold, palladium, platinum, black iron oxide, and the like, as well as near infrared absorbing dyes, including, but not limited to, those disclosed in U.S. Pat. No. 6,197,851, incorporated herein by reference.

The iron oxide, which is preferably black, may be used in very finely divided form, e.g., from about 0.01 μm to about 200 μm, or from about 0.1 μm to about 10.0 μm, or from about 0.2 μm to about 5.0 μm. Suitable forms of black iron oxide include, but are not limited to, magnetite and magnetite. Red iron oxide is less preferred as it imparts an undesirable red hue to the resultant polymer. Such oxides are described, for example, on pages 323-349 of *Pigment Handbook*, Vol. 1 (1973), John Wiley & Sons, incorporated herein by reference.

The compositions of the present invention optionally may additionally contain one or more UV absorbing compounds. One example includes UV-absorbing compounds which are covalently bound to the polyester molecule as either a comonomer, a side group, or an end group. Suitable UV-absorbing compounds are thermally stable at polyester processing temperatures, absorb in the range of from about 320 nm to about 380 nm, and are nonextractable from the polymer. The UV-absorbing compounds preferably provide less than about 20%, more preferably less than about 10%, transmittance of UV light having a wavelength of 370 nm through a bottle wall 305 μm thick. Suitable chemically reactive UV absorbing compounds may include, for example, substituted methine compounds.

Suitable compounds, their methods of manufacture and incorporation into polyesters are further disclosed in U.S. Pat. No. 4,617,374, the disclosure of which is incorporated herein by reference. The UV-absorbing compound(s) may be present in amounts between about 1 ppm to about 5,000 ppm by weight, preferably from about 2 ppm to about 1,500 ppm, and more preferably between about 10 ppm and about 500 ppm by weight. Dimers of the UV absorbing compounds may also be used. Mixtures of two or more UV absorbing compounds may be used. Moreover, because the UV absorbing compounds are reacted with or copolymerized into the backbone of the polymer, the resulting polymers display improved processability including reduced loss of the UV absorbing compound due to plateout and/or volatilization and the like.

The polyester compositions of the present invention are suitable for forming a variety of shaped articles, including films, sheets, tubes, preforms, molded articles, containers and the like. Suitable processes for forming the articles are known and include extrusion, extrusion blow molding, melt casting, injection molding, stretch blow molding, thermoforming, and the like.

The polyesters of this invention may also, optionally, contain color stabilizers, such as certain cobalt compounds. These cobalt compounds can be added as cobalt acetates or cobalt alcoholates (cobalt salts or higher alcohols). They can be added as solutions in ethylene glycol. Polyester resins containing high amounts of the cobalt additives can be prepared as a masterbatch for extruder addition. The addition of the cobalt additives as color toners is a process used to minimize or eliminate the yellow color, b*, of the resin. Other cobalt compounds such as cobalt aluminate, cobalt benzoate, cobalt chloride and the like may also be used as color stabilizers. It is also possible to add certain-diethylene glycol (DEG) inhibitors to reduce or prevent the formation of DEG in the final resin product. Preferably, a specific type of DEG inhibitor would comprise a sodium acetate-containing composition to reduce formation of DEG during the esterification and polycondensation of the applicable diol with the dicarboxylic acid or hydroxyalkyl, or hydroxyalkoxy substituted carboxylic acid. It is also possible to add stress crack inhibitors to improve stress crack resistance of bottles, or sheeting, produced from this resin.

With regard to the type of polyester which can be utilized, any high clarity, neutral hue polyester, copolyester, etc., in the form of a resin, powder, sheet, etc., can be utilized to which it is desired to improve the reheat time or the heat-up time of the resin. Thus, polyesters made from either the dimethyl terephthalate or the terephthalic acid route or various homologues thereof as well known to those skilled in the art along with conventional catalysts in conventional amounts and utilizing conventional processes can be utilized according to the present invention. Moreover, the type of polyester can be made according to melt polymerization, solid state polymerization, and the like. Moreover, the present invention can be utilized for making high clarity, low haze powdered coatings. An example of a preferred type of high clarity polyester resin is set forth herein below wherein the polyester resin is produced utilizing specific amounts of antimony catalysts, low amounts of phosphorus and a bluing agent which can be a cobalt compound.

As noted above, the polyester is produced in a conventional manner as from the reaction of a dicarboxylic acid having from 2 to 40 carbon atoms with polyhydric alcohols such as glycols or diols containing from 2 to about 20 carbon atoms. The dicarboxylic acids can be an alkyl having from 2 to 20 carbon atoms, or an aryl, or alkyl substituted aryl containing from 8 to 16 carbon atoms. An alkyl diester having from 4 to 20 carbon atoms or an alkyl substituted aryl diester having from 10 to 20 carbon atoms can also be utilized. Desirably, the diols can contain from 2 to 8 carbon atoms and preferably is ethylene glycol. Moreover, glycol ethers having from 4 to 12 carbon atoms may also be used. Generally, most of the commonly produced polyesters are made from either dimethyl terephthalate or terephthalic acid with ethylene glycol. When powdered resin coatings are made, neopentyl glycol is often used in substantial amounts.

Specific areas of use of the polyester include situations wherein preforms exist which then are heated to form a final product, for example, as in the use of preforms which are blow-molded to form a bottle, for example, a beverage bottle, and the like. Another use is in preformed trays, preformed cups, and the like, which are heated and drawn to form the final product. Yet another use relates to polyester yarn which is forced through a plurality of spinnerets having an infrared quench collar thereabout. Additionally, the present invention is applicable to highly transparent, clear and yet low haze powdered coatings wherein a desired transparent film or the like is desired.

This invention can be further illustrated by the following examples of preferred embodiments, although it will be understood that these examples are included merely for purposes of illustration and are not intended to limit the scope of the invention unless otherwise specifically indicated.

EXAMPLES

Example 1

In this example, high crystalline metallic nickel particles were purchased from Alfa Aesar (Stock number 43338) as spherical particles having a stated particle size of 0.08 μm to 0.15 μm. The sample also had a stated purity of 99.8%, a specific area of 4.5 m2/g to 8.5 m2/g, and a tap density of 1.0 g/cm3 to 2.5 g/cm3. The particles were found to have a $d_{50}$ of 0.25 μm, with a $d_{50}$ value ranging from about 0.1 μm to about 0.7 μm, as measured by scanning electron microscopy.

The metallic nickel particles were added during melt compounding to a commercial PET resin, VORIDIAN™ 9921 Polymer (a copolymer PET that has been crystallized and has an I.V. of 0.8, available from Eastman Chemical Company, Kingsport, Tenn.). A concentrate containing 464 ppm nickel was prepared using VORIDIAN 9921 Polymer as the base resin. The extrusions were performed using a one-inch single-screw extruder with Saxton and Pineapple mixing head. The extruder was also equipped with pelletization capability. The concentrates were then let down into 9921 Polymer at different concentrations ranging from 5 ppm to 400 ppm. During the compounding process, 9921 Polymer was used to purge the extruder barrel several times to ensure no cross contamination occurred between different batches.

After melt compounding, discs with a diameter of 3 cm and a thickness of 0.17 cm were molded using a Daca® Microcompounder/Microinjector. Molded discs were also prepared from the 9921 Polymer as a control. The molded discs were then used for both color (L*, a*, b* and haze) and reheat measurements.

Color measurement of the molded discs was conducted in the following manner. A Hunter Lab UltraScan spectrophotometer was used to measure L*, a* and b* on three discs stacked together (approximately 0.51 cm thickness). The instrument was operated using a D65 illuminant light source with a 10° observation angle and integrating sphere geometry. The color measurements were made in the total transmission (TTRAN) mode, in which both light transmitted directly through the sample and the light that is diffusely scattered is measured. The discs were stacked together using a holder in front of the light source, with the light normally incident on the disc surface. Haze was determined as the ratio of the diffuse light intensity to the total light intensity transmitted by the specimen. Haze was calculated according to the following formula:

$$\text{Haze} = \left( \frac{Y_{diffusetransmission}}{Y_{totaltransmission}} \right) \times 100$$

where Y represents the intensity of light.

The reheat measurement on molded discs was carried out as follows. The disc was placed onto a support which was in contact with the sample along its edges only. An actuator then automatically moved the disc beneath a pyrometer and measured the initial temperature ($T_i$). The disc was then moved to a fixed distance below a lamp housing equipped with a bulb (GE DYH projection bulb, 250 W, 120 V) operating at 60 V. The sample was exposed to a radiant light for 20 seconds. The color temperature of the lamp was approximately 2,200° C. After heating, the disc was automatically returned to the pyrometer where the surface temperature ($T_f$) of the center area of the side which faced the lamp (front side) was recorded two seconds after the lamp was turned off. A 90 second cooling cycle was used between consecutive tests, during which a fan cooled the lamp housing prior to loading the next sample. The reheat index (known as RHI) was then calculated by comparing the temperature difference of a test sample with that of the control sample as shown in the following equation:

$$RHI = \frac{(T_f - T_i)_{sample}}{(T_f - T_i)_{control}}$$

As shown in FIG. 1, Tables 1 and 2 below, the average particle size of the nickel powder was in the range of 0.1 μm to 0.7 μm with a mean value of 0.25 μm, and a standard deviation of 0.12 μm.

TABLE 1

Quantiles of the particle size analysis.

| Cumulative percentage | Statistical notation | Particle diameter (μm) |
|---|---|---|
| 100.00% | maximum | 0.62 |
| 99.50% |  | 0.62 |
| 97.50% |  | 0.61 |
| 90.00% |  | 0.50 |
| 75.00% | quartile | 0.36 |
| 50.00% | median | 0.25 |
| 25.00% | quartile | 0.19 |
| 10.00% |  | 0.16 |
| 2.50% |  | 0.12 |
| 0.50% |  | 0.11 |
| 0.00% | minimum | 0.11 |

TABLE 2

Moments of the particle size analysis.

| Mean | 0.29 |
|---|---|
| Std Dev | 0.12 |
| Std Err Mean | 0.02 |
| upper 95% Mean | 0.32 |
| lower 95% Mean | 0.25 |

The final nickel concentration in the polymers was determined by inductively coupled plasma optical emission spectroscopy (ICP-OES) using a Perkin-Elmer Optima 2000 instrument. The levels of loading of nickel and the color and reheat results are shown in Table 3.

TABLE 3

Reheat and color results of melt compounded disc samples with nickel as reheat additive.

| Sample | Reheat additive | Measured nickel concentration (ppm) | RHI | L* | a* | b* | haze |
|---|---|---|---|---|---|---|---|
| 1 | none | 0 | 1.00 | 83.6 | −0.8 | 4.2 | 2.3 |
| 2 | Ni | 7 | 1.03 | 81.3 | −0.8 | 4.4 | 3.9 |
| 3 | Ni | 15 | 1.05 | 78.3 | −0.6 | 4.3 | 6.2 |
| 4 | Ni | 32 | 1.08 | 73.1 | −0.5 | 4.3 | 10.4 |
| 5 | Ni | 40 | 1.10 | 70.0 | −0.3 | 4.1 | 12.8 |
| 6 | Ni | 46 | 1.12 | 69.6 | −0.5 | 4.6 | 14.3 |
| 7 | Ni | 90 | 1.20 | 58.6 | 0.1 | 3.8 | 21.2 |
| 8 | Ni | 94 | 1.21 | 57.5 | 0.0 | 4.1 | 22.8 |
| 9 | Ni | 174 | 1.35 | 40.1 | 0.7 | 2.6 | 36.1 |
| 10 | Ni | 185 | 1.35 | 39.0 | 0.5 | 3.3 | 37.8 |

Figure 2:
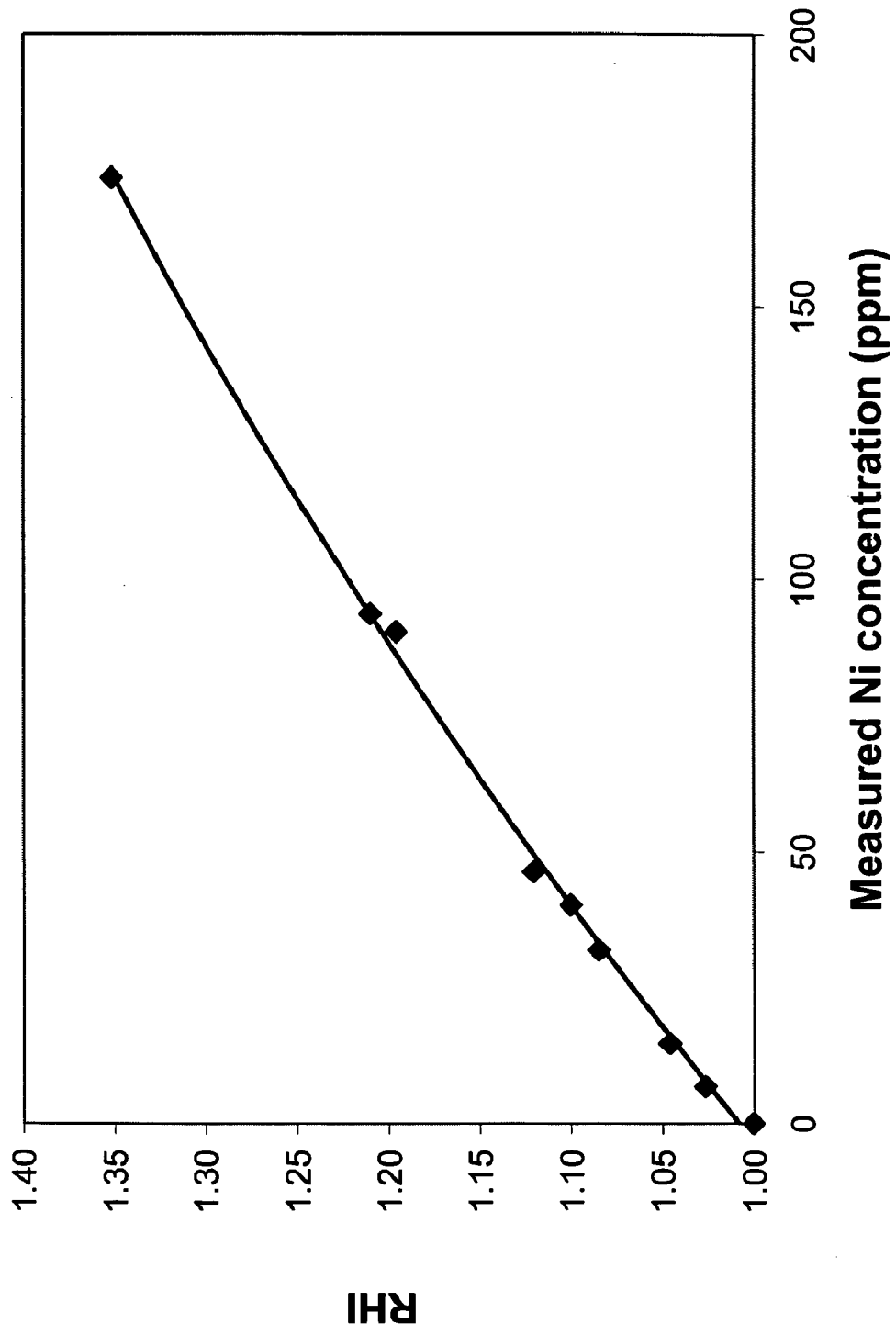
FIG. 2 depicts the relationship between the reheat index and the concentration of metallic nickel particles used as a reheat additive.

FIG. 2 shows the relationship between RHI and the nickel concentration (note: in this example, RHI is calculated using 9921 Polymer as the reference sample since 9921 was the base resin used in this set of experiments). These results show that metallic nickel particles are very effective at increasing the RHI of the resin.

Figure 3:
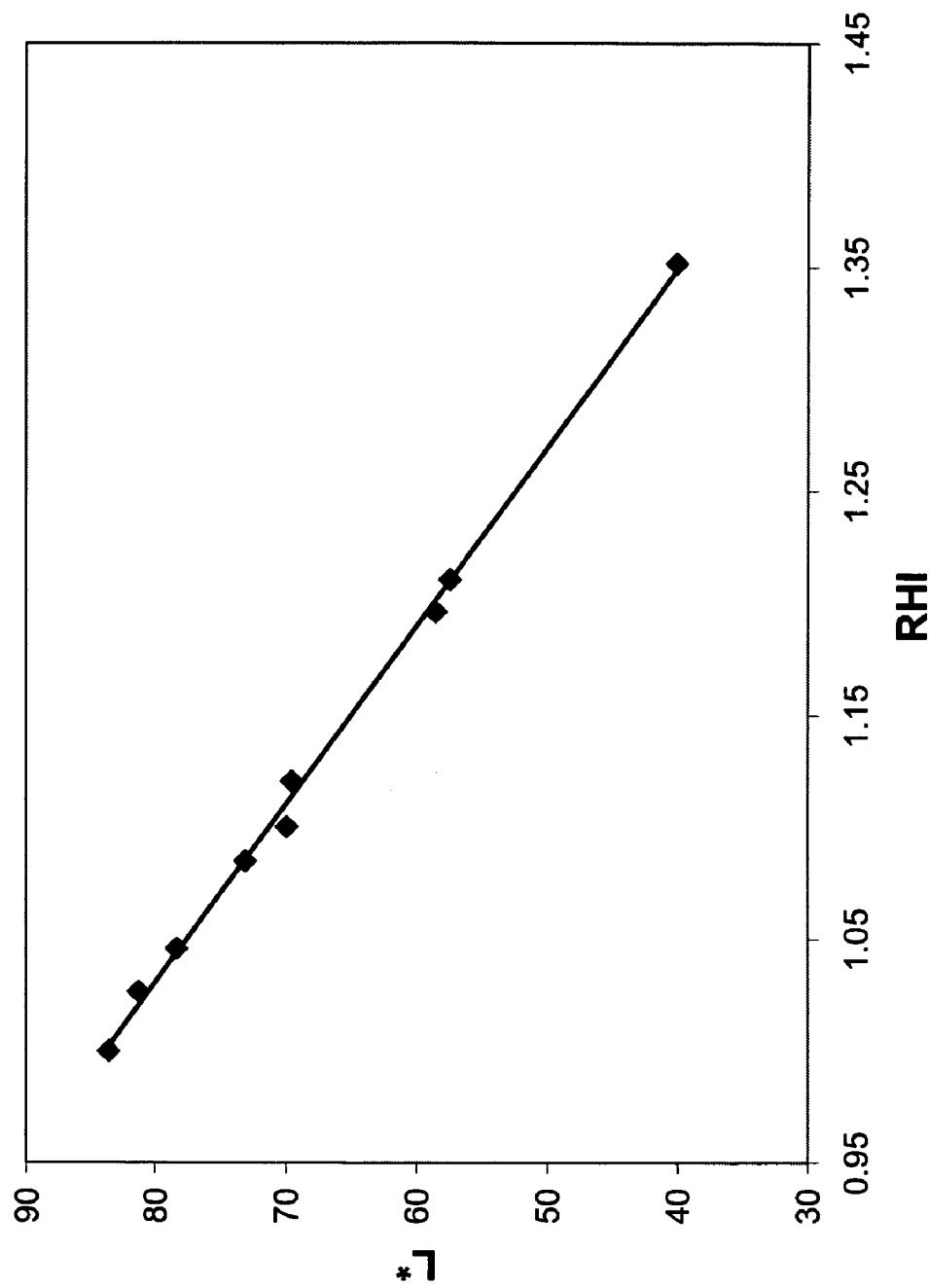
FIG. 3 depicts the impact of the reheat index on the L* value for a polyester containing metallic nickel particles.

In FIG. 3, the relationship between RHI and L* is illustrated for a polyester containing metallic nickel particles. The results show that when compounded into PET, the metallic nickel particles provide satisfactory L* values.

Figure 4:
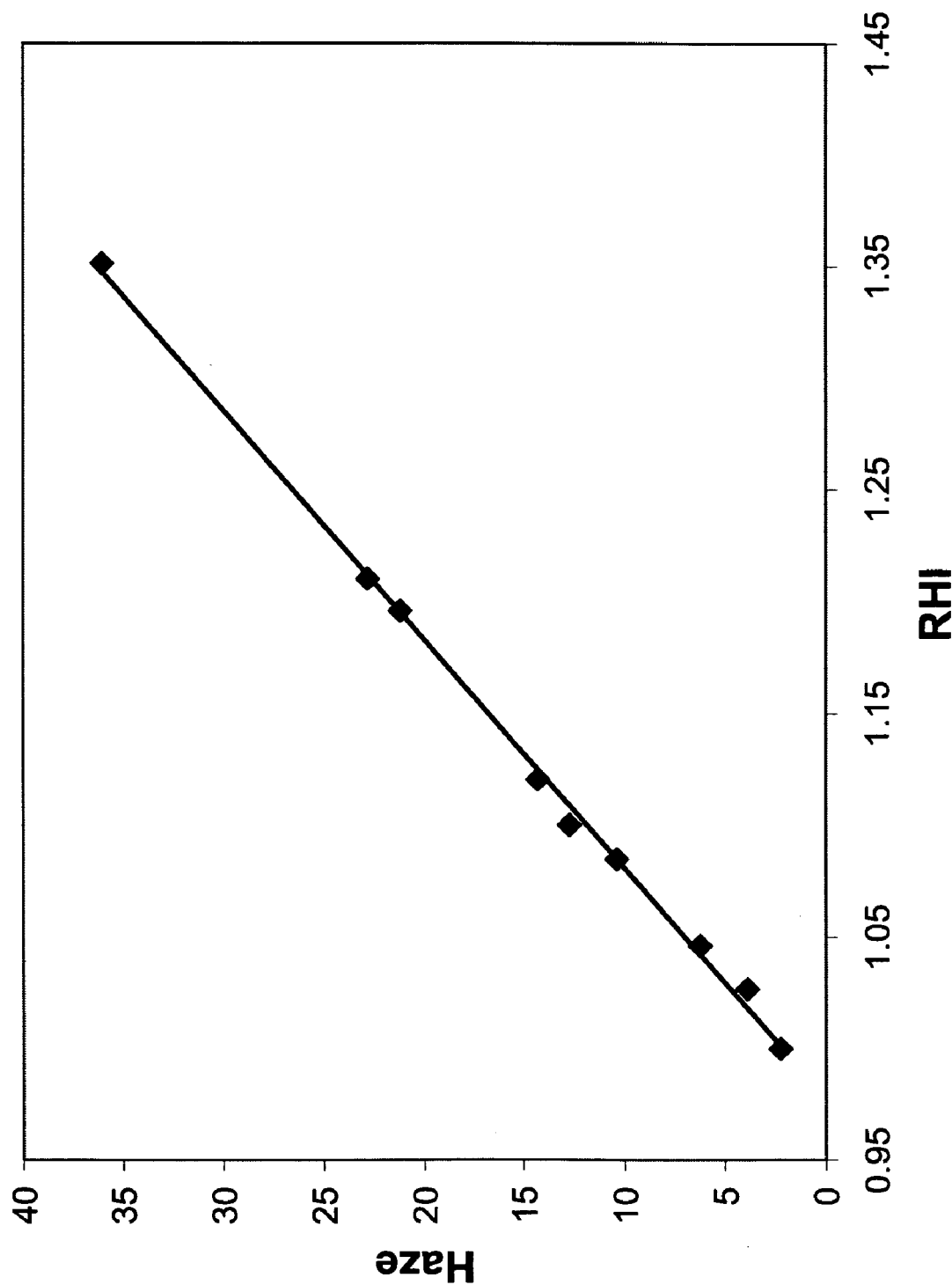
FIG. 4 depicts the impact of the reheat index on the haze for a polyester containing metallic nickel particles.

FIG. 4 shows the correlation between RHI and haze for 9921 Polymer containing metallic nickel particles.

Figure 5:
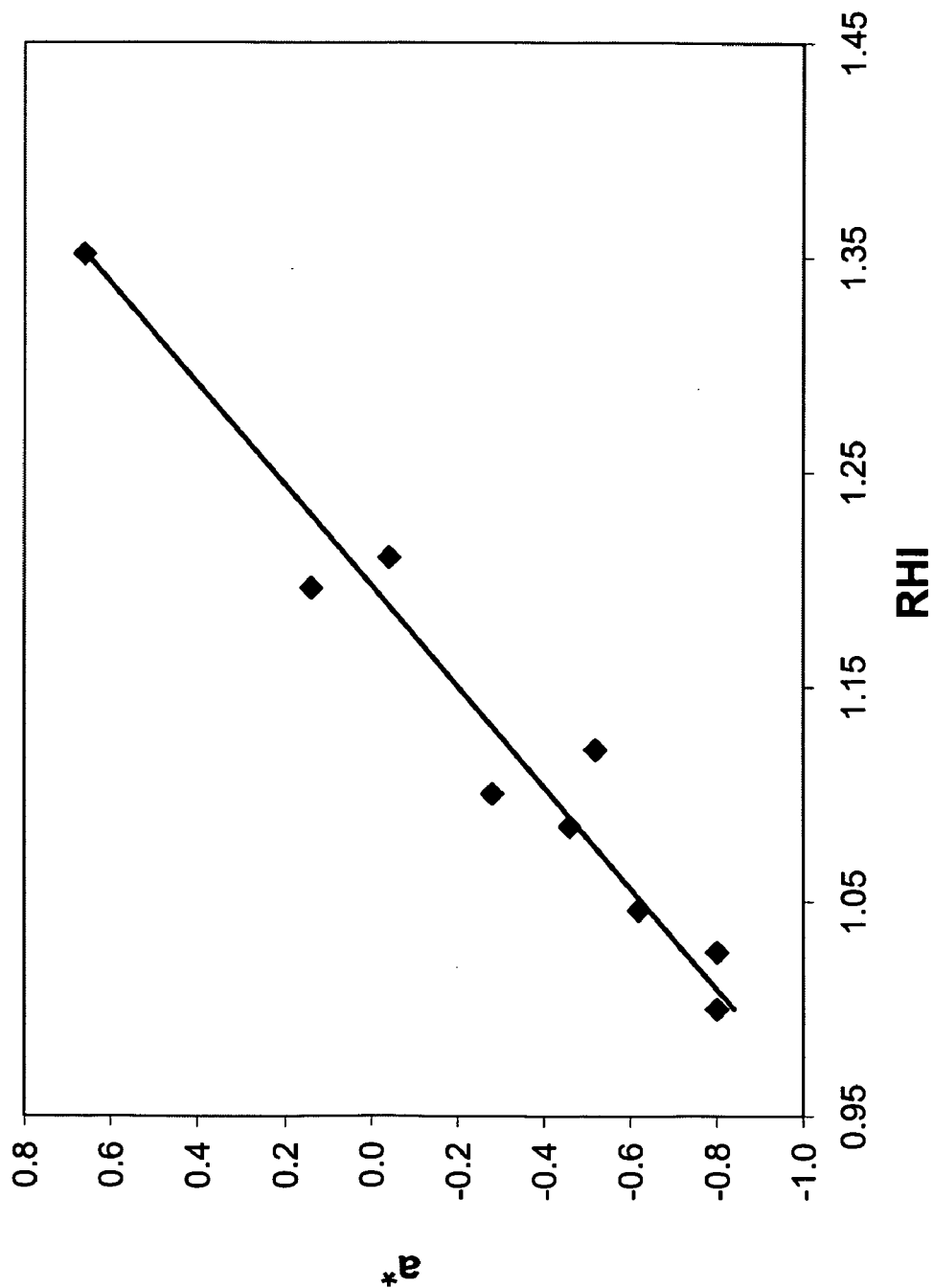
FIG. 5 depicts the relationship between the reheat index and a* value for a polyester containing metallic nickel particles.
Figure 6:
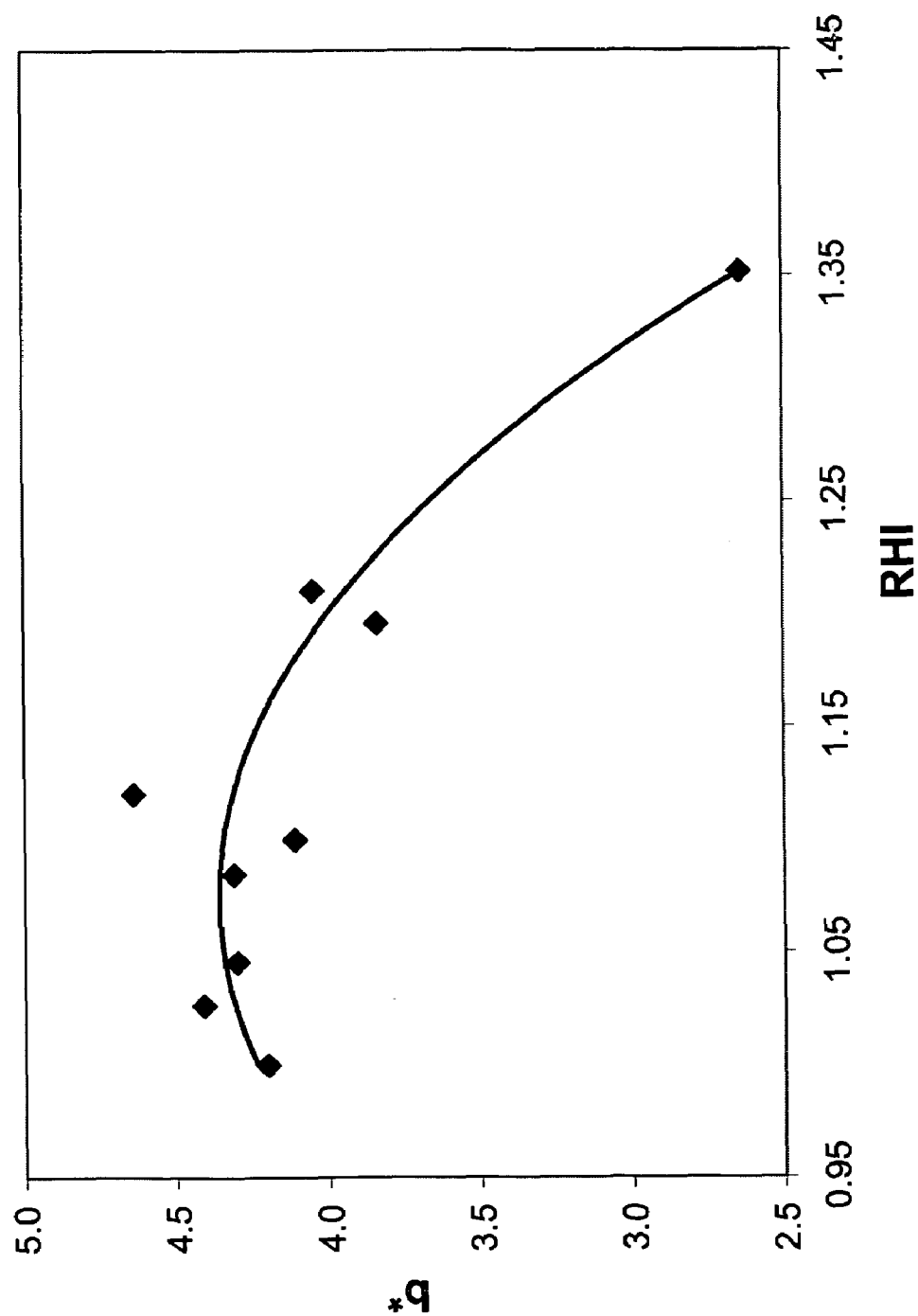
FIG. 6 depicts the relationship between the reheat index and the b* value of a polyester containing metallic nickel particles.

FIGS. 5 and 6 show that the addition of metallic nickel particles to 9921 Polymer causes only insignificant shifts in color results (a* and b*).

Example 2

Nickel particles as described in Example 1 were added to a PET polymerization process in order to determine their effect on reheat rate and color. Polymers were prepared in the following manner.

In the first step, a PET oligomer was prepared by charging purified terephthalic acid (PTA), purified isophthalic acid (PIA), ethylene glycol (EG), and antimony trioxide (ATO) catalyst to a 2-L autoclave. The formulation was as follows: 651.0 g PTA, 13.0 g PIA, 396.0 g EG and 0.249 g ATO. The raw materials were reacted at 245° C. and 40 psig for 200 minutes. At the end of the reaction, the resulting oligomer was discharged from the reactor and allowed to solidify at room temperature and was then pulverized to a coarse powder.

In the second step, a polymer was prepared from the oligomer in the following manner. Oligomer (121 g) was charged to a 500 mL polymerization flask equipped with a polymer head, an overhead stirrer, a nitrogen inlet, a dry-ice condensing trap, and a vacuum source. A metal bath was used as the heating source. Polymerization was carried out in three stages using the following conditions:
Stage 1 (early prepolymer): 272 ° C., 140 torr, 70 minutes
Stage 2 (prepolymer): 275° C., 20 torr, 70 minutes
Stage 3 (polycondensation): 285° C., 2.5 torr, 100 minutes The nickel powder was dispersed in EG (to a final concentration of 3.9 wt. % nickel in EG) and then a portion of the dispersion was added to the polymerization process during the prepolymer. Phosphorus was added as a phosphoric acid solution in EG (1 wt. % phosphorus) immediately following the charge. A series of polymers was prepared with nickel charges of from 0 ppm (control) to 287 ppm. Using this procedure, polymers were produced with an It.V. of 0.62 dL/g containing 220 ppm antimony as catalyst, 30 ppm phosphorus and 0-130 ppm nickel. The concentrations of antimony and phosphorus in the polymer were determined by X-ray fluorescence (XRF), and the final nickel concentration in the polymers was determined by ICP-OES.

Molded discs were prepared, and RHI and color were prepared as described in Example 1. In the case of the lab polymers, the reheat rate was calculated by using a control polymer containing 0 ppm reheat additive. The results are given in Table 4.

TABLE 4

Reheat and color results of lab polymerized disc samples with nickel as reheat additive.

| Sample | Reheat additive | Measured nickel concentration (ppm) | RHI | L* | a* | b* | haze |
|---|---|---|---|---|---|---|---|
| 11 | none | 0 | 1.00 | 82.3 | −0.5 | 6.6 | 5.9 |
| 12 | Ni | 11 | 1.01 | 81.6 | −0.4 | 7.1 | 6.0 |
| 13 | Ni | 19 | 1.04 | 81.0 | −0.6 | 7.3 | 9.0 |
| 14 | Ni | 116 | 1.29 | 62.5 | −2.4 | 6.5 | 33.1 |
| 15 | Ni | 129 | 1.31 | 58.0 | −2.2 | 6.4 | 44.1 |

Figure 7:
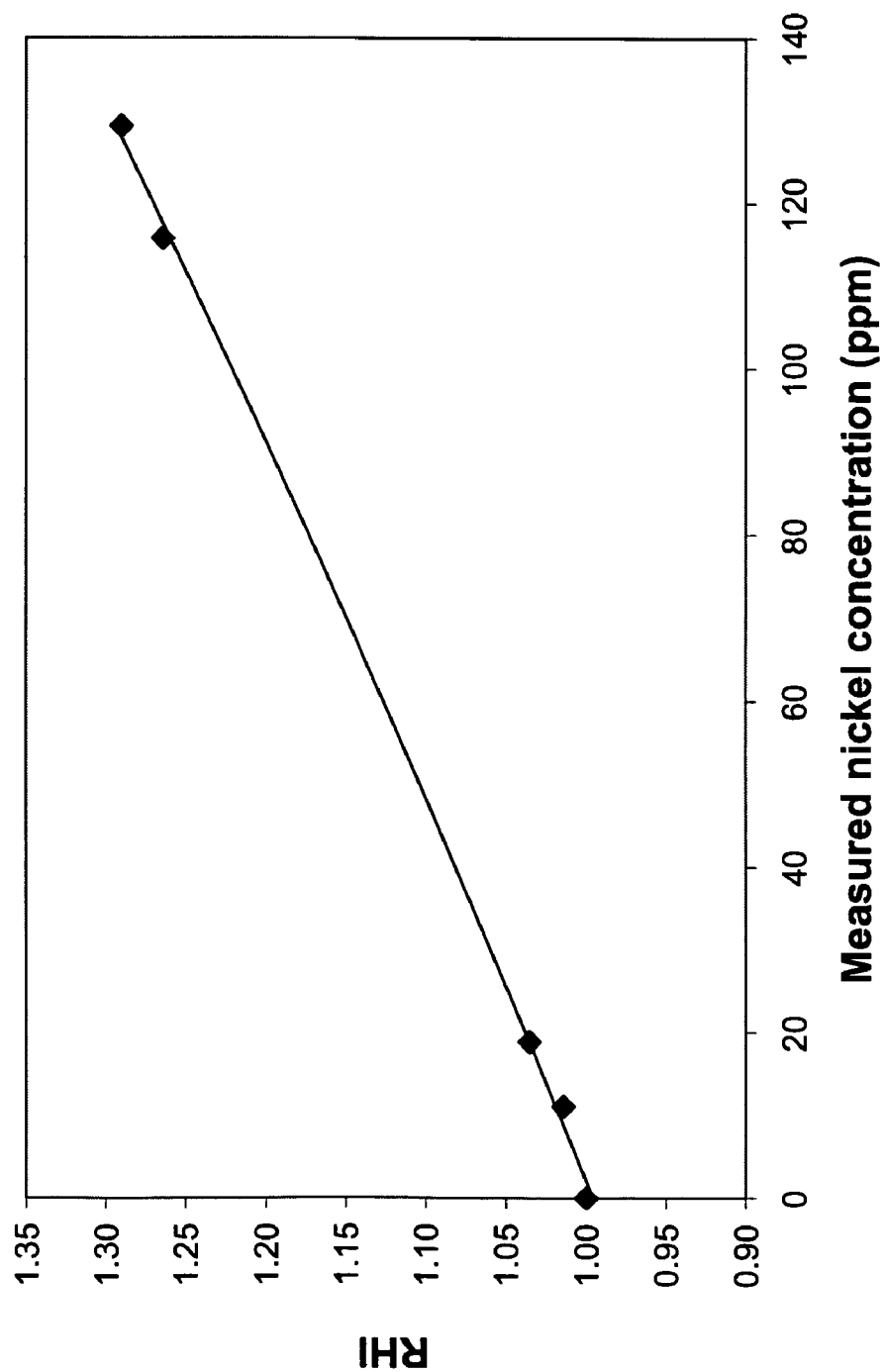
FIG. 7 depicts the effect of additive concentration on the reheat index for metallic nickel particles added during the polyester polymerization process.
Figure 8:
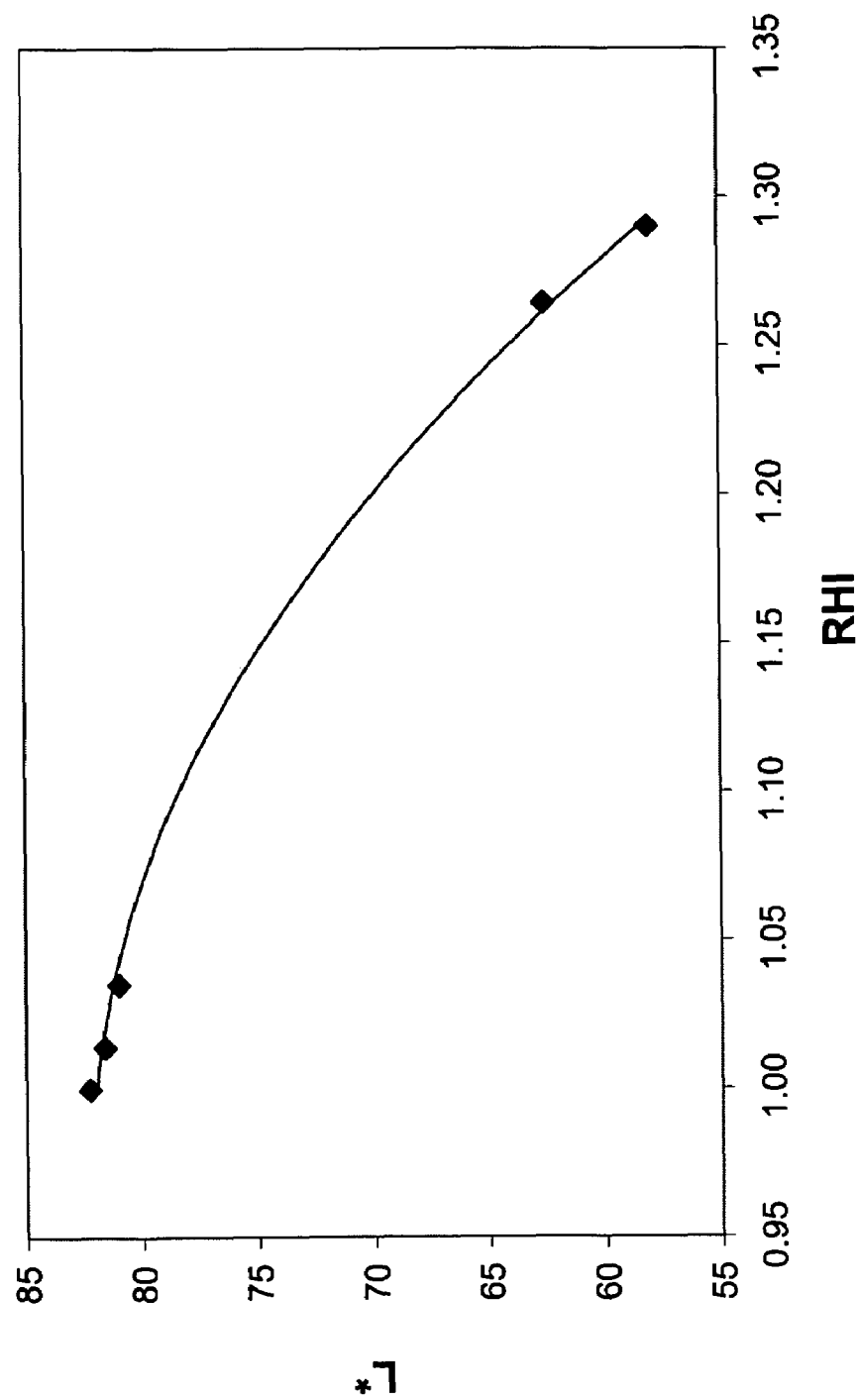
FIG. 8 depicts the relationship between L* value and reheat index for polyester containing metallic nickel particles, when added during the polymerization process.
Figure 9:
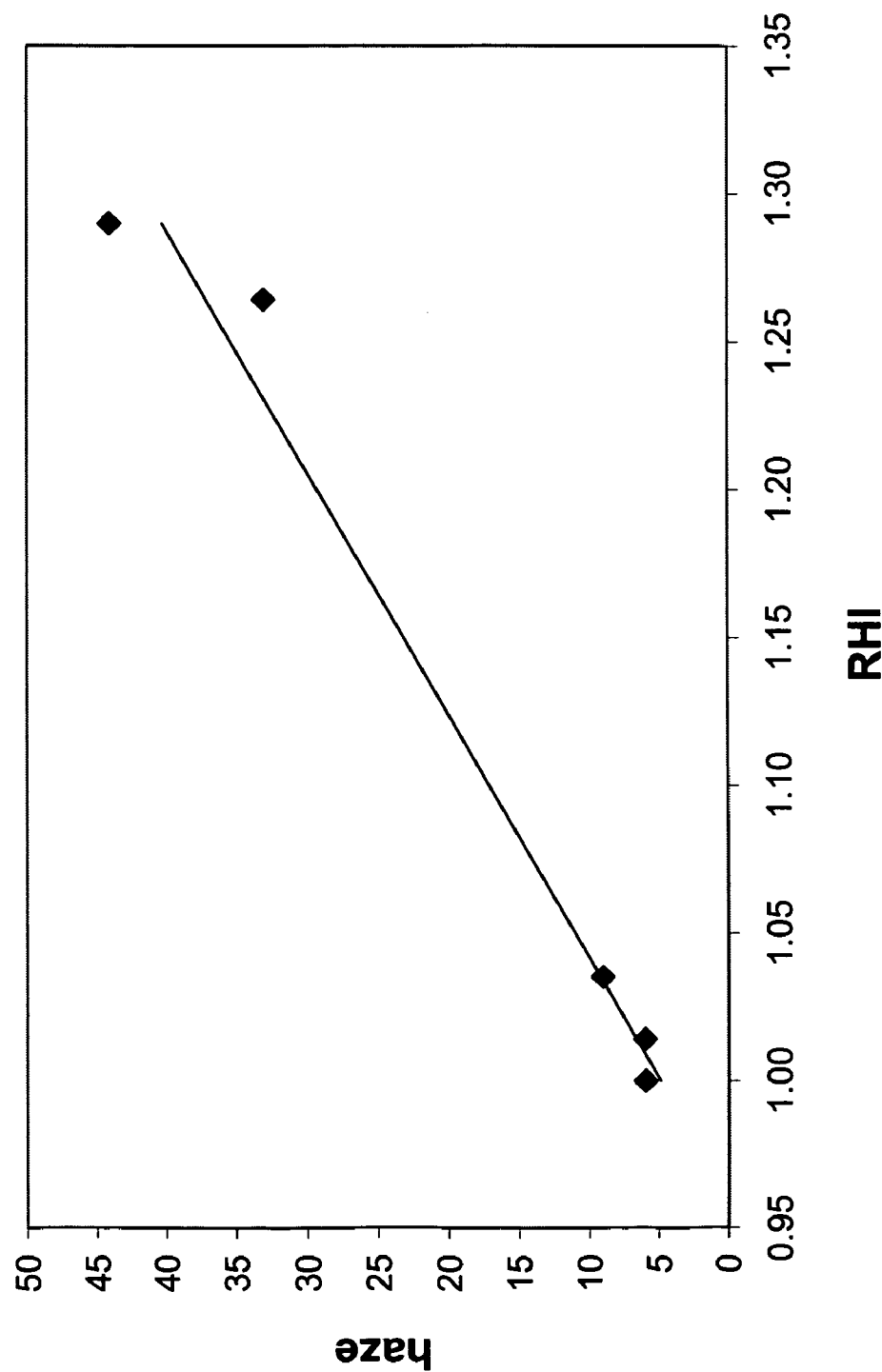
FIG. 9 depicts the relationship between haze and reheat index for polyesters containing metallic nickel particles when added to the polymerization process.

FIG. 7 shows that on a concentration basis, metallic nickel particles with a median particle size of about 0.25 μm were effective at increasing the polymer reheat. FIG. 8 shows that polymers containing metallic nickel particles have acceptable L* values. FIG. 9 shows the correlation between reheat rate and haze for polymers containing nickel particles.

Figure 10:
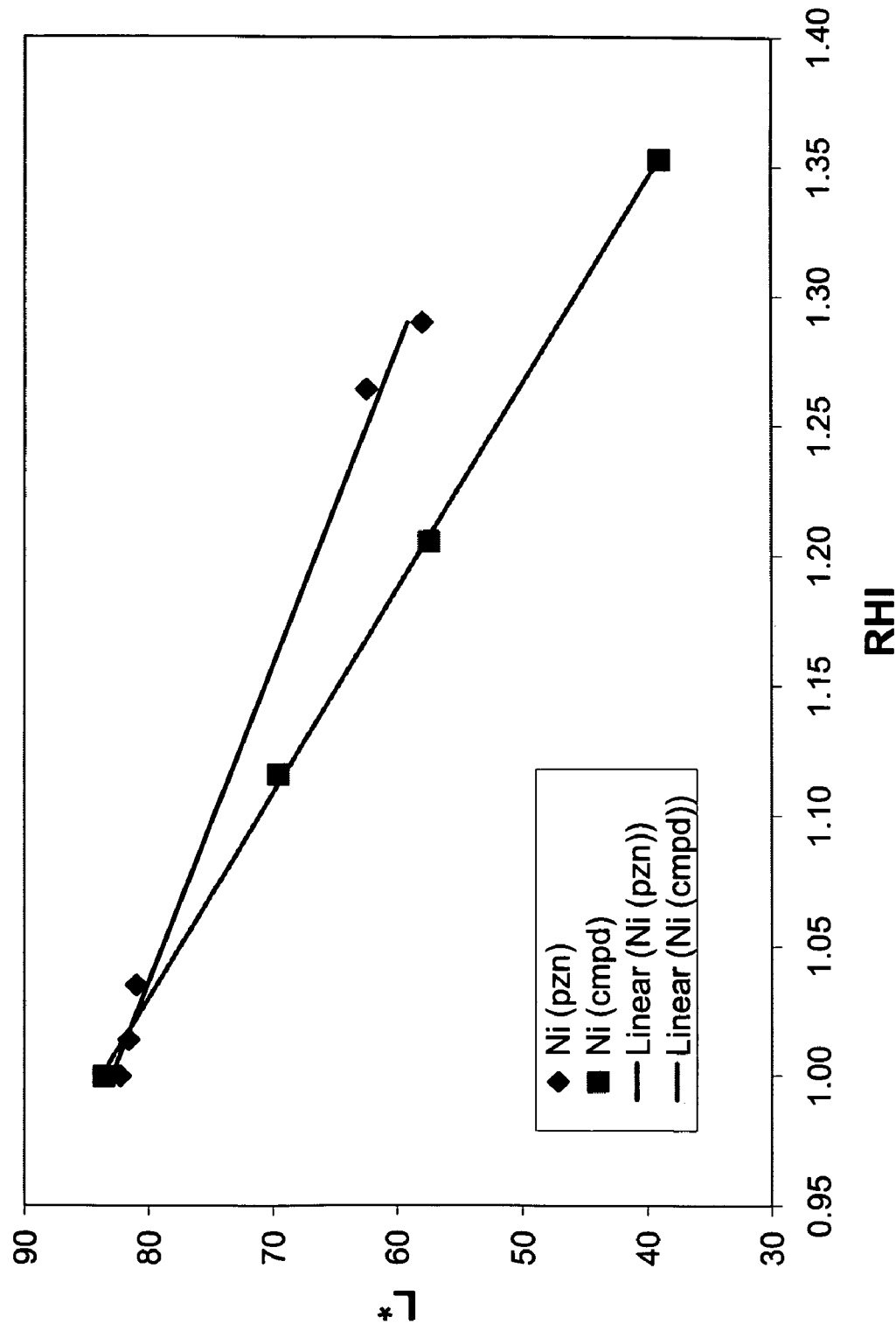
FIG. 10 depicts the relationship between L* value and reheat index for nickel metallic particles added by two different methods: addition to the polymerization process (pzn) and by melt compounding into a polyester (cmpd).

FIG. 10 compares the L* and RHI results obtained when metallic nickel particles are compounded into 9921 Polymer, as described in Example 1, and the results obtained when nickel particles are added during the polymerization process, as described in Example 2. The plot shows that the preferred mode of addition is during the polymerization process, because the impact on L* is less.

Although we believe that much if not most of the reheat effect observed in Samples 12 through 15 is a function of the metallic nickel additive, it is possible that some of this reheat effect could be due to the formation of antimony metal particles by the reduction of the antimony polymerization catalyst present in the polymer by nickel metal. This reduction of the antimony catalyst could be avoided, if desired, by the use of a different (i.e. non-antimony) polycondensation catalyst.

Example 3

This example illustrates the improvement in oxidative stability provided by metallic nickel reheat particles compared to antimony reheat particles. A polymer was prepared, in the manner described above, with a charge of 75 ppm nickel, and a polymer containing 1,000 ppm antimony was prepared as a comparative example. Both polymer samples were subjected to solid-state polymerization using both pure nitrogen and nitrogen containing 10% air as the solid-stating gas. Solid-state polymerization conditions were the following: 45 g charge of polymer to solid-state polymerization unit; 4.0 SCFH nitrogen flow rate; 216° C. temperature; and 4.0 hr reaction time. After the solid-state reaction was completed, the samples were molded into discs, and RHI was measured as described above.

Table 5 contains the reheat results on the nickel and antimony-containing polymers that were solid-stated in nitrogen atmosphere, and nitrogen containing 10% air. Whereas RHI dropped from 1.39 to 1.18 for polymers containing antimony, it remained constant at 1.23 for nickel, with the change of solid stating gas composition from pure nitrogen to a mixture of nitrogen and 10% (volumetric) air.

TABLE 5

Impact of solid stating gas composition on reheat.

| Sample | Solid stating gas composition | Nitrogen (100%) | Mixture of nitrogen and air (90/10 volumetric) |
|---|---|---|---|
| 16 | RHI (antimony as reheat agent) | 1.39 | 1.18 |
| 17 | RHI (nickel as reheat agent) | 1.23 | 1.23 |

Example 4

In this example, the concentrate of 9921 Polymer containing 464 ppm nickel particles as described in Example 1 was used to prepare preforms and bottles. The concentrate was combined with Voridian™ CM01 Polymer, which is a PET copolymer containing no reheat additive, to give final nickel concentrations of 27 ppm and 41 ppm. Standard twenty-ounce bottle preforms were prepared used a BOY (22D) injection molding machine operated at a melt temperature of 280° C., and cycle time of 30 s.

Two sets of blow molding experiments were performed using the Sidel SB02/3 blow molding unit so as to check the reheat of each composition. The first set of experiments was conducted in order to evaluate the reheat rates, or preform surface temperature (PST), of the preforms containing nickel particles. A series of five preforms was passed in front of the quartz infrared heaters and the PST of each composition was measured. The higher the PST value, the higher the reheat rate (or RHI) of the composition. The infrared lamp settings for the Sidel SB02/3 blow molding unit are shown in Table 6. The preform heating time in the heaters was 38 seconds, and the power output to the quartz infrared heaters was set at 64%.

TABLE 6

Sidel SBO2/3 lamp settings. Note lamps in Zones 6 through 8 were not turned on.

| | | Lamps ON = 1 OFF = 0 | | |
|---|---|---|---|---|
| Heating zone | Lamp power setting (%) | Heater 1 | Heater 2 | Heater 3 |
| Zone 8 | | | | |
| zone 7 | | | | |
| Zone 6 | | | | |
| Zone 5 | 90 | 1 | 0 | 1 |
| Zone 4 | 90 | 1 | 0 | 1 |
| Zone 3 | 90 | 1 | 0 | 1 |
| Zone 2 | 90 | 1 | 1 | 1 |
| Zone 1 | 90 | 1 | 1 | 1 |

In the second set of experiment, the oven power was changed so as to blow the bottles for different composition at a similar PST to ensue consistent material distribution in the final bottles with different level of nickel particles. The PST has been controlled to be from 112° C. to 115° C. in this set of experiment.

Color measurements on the preforms were performed using a Hunter Lab UltraScan XE (Hunter Associates Laboratory, Inc., Reston Va.), which employs diffuse/8° (illumination/view angle) sphere optical geometry. The color scale employed was the CIE LAB scale with D65 illuminant and 10° observer specified. Twenty ounce preforms, which have a sidewall thickness of 0.154 inches, overall height of 3.93 inches, and outer diameter of 0.846 inches, were measured in regular transmission mode using ASTM D1746, "Standard Test Method for Transparency of Plastic Sheeting". Preforms were held in place in the instrument using a preform holder, available from HunterLab, and triplicate measurements were averaged, whereby the sample was rotated 90° about its center axis between each measurement.

Bottle sidewall haze was measured using a BYK-Gardner (Silver Spring, Md.) Haze-Gard Plus according to ASTM D 1003 on sections of the bottle sidewalls with a sidewall thickness of 0.012 inches.

The results set forth in Table 7 show that the formulations containing nickel particles had high PST compared to CM01, indicating that the nickel particles were very efficient at absorbing the energy from the quartz infrared heaters of the blow molding machine.

TABLE 7

Preform surface temperature (PST) at 64% oven power and preform color results.

| Sample | Resin | Reheat additive | Measured nickel conc. (ppm) | PST (° C.) at 64% Oven power | Preform Color Results | | |
|---|---|---|---|---|---|---|---|
| | | | | | L* | a* | b* |
| 18 | CM01 | Ni | 27 | 120 | 69.6 | −0.3 | 3.3 |
| 19 | CM01 | Ni | 41 | 125 | 63.2 | −0.2 | 3.6 |
| 20 | CM01 | none | 0 | 110 | 81.2 | −0.4 | 2.8 |

As shown in Table 8, the formulations containing nickel particles (entries 21 and 22) required lower oven power to reach a PST in the range of 112 to 115° C. compared to CM01 resin (entry 23). It further illustrates that nickel particles only minimally impact the bottle sidewall haze values.

TABLE 8

Sidewall haze for bottles blown at the same preform surface temperature (PST). Note the oven power needed to reach the same PST in each sample is also given.

| Sample | Resin | Reheat additive | Measured nickel concentration (ppm) | Oven Power (%) | PST (° C.) | Bottle Sidewall Haze (%) |
|---|---|---|---|---|---|---|
| 21 | CM01 | Ni | 27 | 59 | 115 | 1.5 |
| 22 | CM01 | Ni | 41 | 54 | 112 | 1.8 |
| 23 | CM01 | none | 0 | 69 | 113 | 1.0 |

Example 5

Hastelloy® C276 metal particles were purchased from Aldrich as spherical particles with a stated median particle size of 0.1 µm. The alloy has a stated nominal metal content: 57% nickel, 15.5% chromium, 16% molybdenum, 5.5% iron, 3.75% tungsten, 0.5% manganese, and 0.5% silicon. The Hastelloy particles were then compounded into a commercial CM01 resin using a single screw extruder with Pineapple and Saxton mixing head. Standard twenty ounce bottle preforms were prepared used a BOY (22D) injection molding machine. Preform color measured following the procedures as listed in Example 4. Preform surface temperature (PST) was performed using a lab scale Eastman RHB-Free Blow Apparatus with five infrared lamps turned on. The power input to each lamp from the bottle to top was 140%, 140%, 140%, 95%, and 95%, respectively. The concentration of Hastelloy was detected by ICP-OES described in Example 1. The final concentration of Hastelloy is shown in Table 9.

TABLE 9

Preform color and preform surface temperature (PST) results.

| Sample | Reheat additive | Measured Hastelloy concentration (ppm) | PST (° C.) | L* | a* | b* |
|---|---|---|---|---|---|---|
| 24 | None | 0 | 151.8 | 83.5 | −0.6 | 2.6 |
| 25 | Hastelloy | 8.1 | 155.9 | 75.5 | 0.0 | 3.6 |
| 26 | Hastelloy | 11.1 | 158.0 | 75.3 | 0.0 | 3.8 |
| 27 | Hastelloy | 16.4 | 158.1 | 65.8 | 0.6 | 4.8 |
| 28 | Hastelloy | 24.4 | 161.7 | 60.9 | 1.0 | 5.3 |

From Table 9, it is clear that the addition of Hastelloy to CM01 commercial polymer greatly increases the reheat of the base resin while maintaining satisfactory color.

The invention has been described in detail with particular reference to preferred embodiments, but it will be understood that variations and modifications can be effected within the spirit and scope of the invention. Although specific terms are employed, they are used in a generic and descriptive sense only and not for purposes of limitation, the scope of the invention being set forth in the following claims.

We claim:

1. A polyester composition having improved reheat, comprising:
   a poly(ethylene terephthalate) polyester polymer, present in the polyester composition in an amount of at least 95 wt. % based on the weight of polymers; and
   metallic nickel particles chosen from particles of nickel metal in the elemental state and particles of alloys wherein nickel is the major alloying element, having a median particle size from about 0.005 µm to 0.9 µm, randomly dispersed in the polyester polymer in an amount from 0.5 ppm to 32 ppm, with respect to the total weight of the polyester composition;
   wherein said polyester composition is in the form of pellets, a bottle preform, a bottle, or a container.

2. The polyester composition of claim 1, wherein the polyester composition is in the form of a beverage bottle preform.

3. The polyester composition of claim 1, wherein the polyester composition is in the form of a beverage bottle.

4. The polyester composition of claim 1, wherein the polyester polymer comprises a continuous phase, and wherein the metallic nickel particles are dispersed within the continuous phase.

5. The polyester composition of claim 1, wherein the metallic nickel particles provide the polyester composition with a reheat rate index of at least 1.05 while maintaining the polyester composition at an L* brightness of 70 or more at a reheat rate index of 1.05.

6. The polyester composition of claim 1, wherein the metallic nickel particles comprise nickel-coated particles.

7. The polyester composition of claim 1, wherein the metallic nickel particles comprise hollow spheres comprised of nickel.

8. The polyester composition of claim 1, wherein the metallic nickel particles comprise a nickel alloy, wherein nickel is present in an amount of at least 57 wt. %, with respect to the total weight of the nickel alloy.

9. The polyester composition of claim 8, wherein the nickel alloy further comprises iron, chromium, and molybdenum.

10. The polyester composition of claim 1, wherein the metallic nickel particles comprise a nickel alloy that includes nickel and one or more of: germanium, iron, chromium, tungsten, molybdenum, titanium, vanadium, carbon, or tantalum.

11. The polyester composition of claim 1, wherein the metallic nickel particles have a particle size distribution in which the span (S) is from 0 to about 10.

12. The polyester composition of claim 1, wherein the metallic nickel particles have a particle size distribution in which the span (S) is from 0.01 to 2.

13. A polyester composition having improved reheat, comprising:
   a polyester polymer in which poly(ethylene terephthalate) residues comprise at least 90 wt. % of the polyester polymer, present in the polyester composition in an amount of at least 95 wt. % based on the weight of polymers; and
   metallic nickel particles, having a median particle size from about 0.005 µm to 0.9 µm, randomly dispersed in the polyester polymer in an amount from 0.5 ppm to 32 ppm, wherein the polyester composition has a reheat index of 1.05 or more and an L* brightness level of 70 or more at the reheat rate index of 1.05.

* * * * *